United States Patent
Kawaba et al.

(10) Patent No.: US 8,924,551 B2
(45) Date of Patent: Dec. 30, 2014

(54) ANALYSIS METHOD AND INFORMATION PROCESSING APPARATUS

(71) Applicant: Fujitsu Limited, Kawasaki-shi (JP)

(72) Inventors: Motoyuki Kawaba, Kawasaki (JP); Yasuhiko Kanemasa, Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 211 days.

(21) Appl. No.: 13/733,546

(22) Filed: Jan. 3, 2013

(65) Prior Publication Data
US 2013/0246613 A1 Sep. 19, 2013

(30) Foreign Application Priority Data
Mar. 15, 2012 (JP) ................................. 2012-058464

(51) Int. Cl.
G06F 15/173 (2006.01)
H04L 12/26 (2006.01)
G06F 11/07 (2006.01)
G06F 11/34 (2006.01)
H04L 12/24 (2006.01)

(52) U.S. Cl.
CPC ............ *H04L 43/10* (2013.01); *G06F 11/0709* (2013.01); *G06F 11/0745* (2013.01); *G06F 11/0757* (2013.01); *G06F 11/079* (2013.01); *G06F 11/3409* (2013.01); *H04L 43/04* (2013.01); *H04L 41/064* (2013.01)
USPC .......................................... 709/224; 709/225

(58) Field of Classification Search
USPC ............................ 709/201–207, 233, 224, 229
See application file for complete search history.

(56) References Cited

U.S. PATENT DOCUMENTS

| | | | | |
|---|---|---|---|---|
| 8,510,468 | B2 * | 8/2013 | Vange et al. | 709/238 |
| 8,543,690 | B1 * | 9/2013 | Zeitoun et al. | 709/224 |
| 2004/0030745 | A1 * | 2/2004 | Boucher et al. | 709/203 |
| 2004/0078462 | A1 * | 4/2004 | Philbrick et al. | 709/224 |
| 2005/0160139 | A1 * | 7/2005 | Boucher et al. | 709/203 |
| 2005/0198261 | A1 * | 9/2005 | Durvasula et al. | 709/224 |
| 2007/0214261 | A1 * | 9/2007 | Kikuchi et al. | 709/224 |
| 2008/0306711 | A1 | 12/2008 | Bansal | |
| 2010/0074147 | A1 * | 3/2010 | Decasper et al. | 370/254 |

(Continued)

FOREIGN PATENT DOCUMENTS

JP 2002-268922 9/2002
WO WO-2006/046297 5/2006

OTHER PUBLICATIONS

Extended European Search Report issued May 28, 2013 for corresponding EP patent application No. 13151433.3.

(Continued)

*Primary Examiner* — Sargon Nano
(74) *Attorney, Agent, or Firm* — Fujitsu Patent Center

(57) ABSTRACT

In an information processing apparatus, an extraction unit extracts, from a storage unit, processing period records corresponding to operations whose response times from respective request input times to respective response output times are greater than a threshold. With respect to the operations whose response times are greater than the threshold, a first analysis unit analyzes, based on the request input times in the extracted processing period records, variations in input frequency of operation requests, and a second analysis unit analyzes, based on the response output times in the extracted processing period records, variations in output frequency of responses. A determination unit determines the cause of occurrence of the operations whose response times are greater than the threshold based on the variations in input frequency and output frequency.

12 Claims, 26 Drawing Sheets

(56) References Cited

U.S. PATENT DOCUMENTS

| | | |
|---|---|---|
| 2010/0198912 A1* | 8/2010 | Kawaba et al. ............... 709/203 |
| 2010/0198964 A1* | 8/2010 | Tanaka ........................ 709/224 |
| 2010/0332583 A1* | 12/2010 | Szabo ......................... 709/202 |
| 2011/0072086 A1* | 3/2011 | Newsome et al. ............ 709/204 |
| 2011/0072096 A1* | 3/2011 | Goldstein et al. ............ 709/206 |
| 2011/0185280 A1* | 7/2011 | Nakash et al. ............... 715/736 |
| 2011/0270971 A1* | 11/2011 | Abraham et al. ............. 709/224 |

OTHER PUBLICATIONS

Diaconescu et al., "Automatic Performance Management in Component Based Software Systems", International conference on autonomic computing, 2004. Proceedings, Jan. 1, 2004, pp. 214-221.

Christopher Crowell, "Event Correlation and Root Cause Analysis", Mar. 1, 2004, pp. 1-15.

* cited by examiner

| | 141 | 142 | 143 | 144 | 145 | 146 | 147 |
|---|---|---|---|---|---|---|---|
| | | | | | | | |

140 MESSAGE DATA STORAGE UNIT

| # | Date | Time | | | | | |
|---|---|---|---|---|---|---|---|
| 1 | 2009/09/07 | 12:12:04.787360 | (132290-1) | 194.185.39.24:51272 -> 194.23.5.226:10443 Request HTTP, POST /cgi-bin/AXXPF3943? type=001& zid=AXXG13130& sid=LgkVcFasr8A& uid=1192 |
| 2 | 2009/09/07 | 12:12:04.871576 | (132291) | 194.23.6.227:39931 -> 194.23.7.168:8002 TCP Connect |
| 3 | 2009/09/07 | 12:12:04.872326 | (132289) | 194.23.6.230:39372 <-194.23.7.168:8002 TCP Close request_size=488 reply_size=528 |
| 4 | 2009/09/07 | 12:12:04.872575 | (132291-28991) | 194.23.6.227:39931 -> 194.23.7.168:8002 Request IIOP,AXXG13130/INF/H01 |
| 5 | 2009/09/07 | 12:12:04.882010 | (131268-307) | 194.23.8.198:1521 Request Oracle,select1 into :b0 from DUAL |
| 6 | 2009/09/07 | 12:12:04.882560 | (131268-307) | 194.23.8.169:52245 -> 194.23.8.198:1521 Request Oracle,select1 into :b0 from DUAL |
| 7 | 2009/09/07 | 12:12:04.883208 | (131268-308) | 194.23.8.169:52245 <-194.23.8.198:1521 Response Oracle,16 |
| 8 | 2009/09/07 | 12:12:04.883657 | (131268-308) | 194.23.8.169:52245 -> 194.23.8.198:1521 Request Oracle,DATA |
| 9 | 2009/09/07 | 12:12:04.887500 | (131268-309) | 194.23.8.169:52245 <-194.23.8.198:1521 Response Oracle,6 |
|  |  |  |  | 194.23.8.169:52245 -> 194.23.8.198:1521 Request Oracle, select name into :b0 from customerwhere (branch_id=TO_NUMBER(:b1) and account_number=TO_NUMBER(:b2)) |
| 10 | 2009/09/07 | 12:12:04.887900 | (131268-309) | 194.23.8.169:52245 <-194.23.8.198:1521 Response Oracle,16 |
| 11 | 2009/09/07 | 12:12:04.888899 | (131268-310) | 194.23.8.169:52245 -> 194.23.8.198:1521 Request Oracle, select TO_CHAR(last_update, 'YYYY/MM/DD HH24:MI:SS'),'' from access_log where (branch_id=TO_NUMBER(:b1) and account_number=TO_NUMBER(:b2)) |
| 12 | 2009/09/07 | 12:12:04.889199 | (131268-310) | 194.23.8.169:52245 <-194.23.8.198:1521 Response Oracle,16 |
| 13 | 2009/09/07 | 12:12:04.891445 | (131268-311) | 194.23.8.169:52245 -> 194.23.8.198:1521 Request Oracle, select b.name,NVL(b.email,''),NVL(TO_CHAR(b.last_logon_time,'YYYY/MM/DD HH24:MI:SS'),''), TO_CHAR(a.balance,'FM99999999999999'),TO_CHAR(a.account_type) into :b0,:b1,:b2,:b3,:b4 from account a,customer b where (((b.branch_id=a.branch_idand b.account_number=a.account_number) and b.branch_id=TO_NUMBER(:b5)) and b.account_number=TO_NUMBER(:b6)) |
| 14 | 2009/09/07 | 12:12:04.891844 | (131268-311) | 194.23.8.169:52245 <-194.23.8.198:1521 Response Oracle,16 |
| 15 | 2009/09/07 | 12:12:05.002368 | (131268-312) | 194.23.8.169:52245 -> 194.23.8.198:1521 Request Oracle, update access_logset last_update=TO_DATE(:b0,'YYYY/MM/DD HH24:MI:SS') where (branch_id=TO_NUMBER(:b1) and account_number=TO_NUMBER(:b2)) |
| 16 | 2009/09/07 | 12:12:05.003016 | (131268-312) | 194.23.8.169:52245 <-194.23.8.198:1521 Response Oracle,8 |
| 17 | 2009/09/07 | 12:12:05.007109 | (131268-313) | 194.23.8.169:52245 -> 194.23.8.198:1521 Request Oracle,DATA |
| 18 | 2009/09/07 | 12:12:05.008458 | (131268-313) | 194.23.8.169:52245 <-194.23.8.198:1521 Response Oracle,8 |
| 19 | 2009/09/07 | 12:12:05.010455 | (132291-28991) | 194.23.6.227:39931 <-194.23.7.168:8002 Response IIOP,0 |
| 20 | 2009/09/07 | 12:12:05.023634 | (132290-1) | 194.185.39.24:51272 <-194.23.5.226:10443 Response HTTP,200 |

FIG. 7

|  | INPUT: CONSTANT LOW LEVEL | INPUT: CONSTANT HIGH LEVEL | INPUT: TEMPORARY HIGH LEVEL |
| --- | --- | --- | --- |
| OUTPUT: CONSTANT LOW LEVEL | CONFLICT (PATTERN 1) | OVERLOAD + CONFLICT (PATTERN 2) | INPUT SURGE + CONFLICT (PATTERN 3) |
| OUTPUT: CONSTANT HIGH LEVEL | OVERLOAD + CONFLICT (PATTERN 4) | OVERLOAD (PATTERN 5) | INPUT SURGE (PATTERN 6) |
| OUTPUT: TEMPORARY HIGH LEVEL | CONFLICT (PATTERN 7) | OVERLOAD + CONFLICT (PATTERN 8) | INPUT SURGE + CONFLICT (PATTERN 9) |

FIG. 18

ANALYSIS METHOD AND INFORMATION PROCESSING APPARATUS

CROSS-REFERENCE TO RELATED APPLICATION

This application is based upon and claims the benefit of priority of the prior Japanese Patent Application No. 2012-058464, filed on Mar. 15, 2012, the entire contents of which are incorporated herein by reference.

FIELD

The embodiments discussed herein are related to an analysis method and an information processing apparatus.

BACKGROUND

When a server is used for providing stable services to the users through the network, the response time of the server sometimes increases. Such an increase in response times of the server might occur many times a day.

The causes of increase in response times include external causes due to variations in the external traffic, and internal causes resulting from the internal program structure. If the cause of increase in response times is an external cause, it may be possible to prevent an increase in response times by increasing the hardware resources, such as by increasing the number of servers and by controlling the traffic. On the other hand, if the cause of increase in response times is an internal cause, it may be possible to prevent an increase in response times by modifying the configuration of the software, for example.

In this way, the way to handle an increase in response times differs depending on whether the cause of increase is an external cause or an internal cause. That is, if it is possible to determine whether the cause of increase is an external cause or an internal cause at an early point, the response time of the server may be improved promptly.

As a method for identifying these causes, a "drill-down" approach is often used that observes the behavior in a short period time in detail. However, this drill-down approach is performed manually, and therefore is not efficient.

There have been various methods for analyzing the performance of a server using a computer. For instance, an analysis method has been disclosed that analyzes the responsiveness of a computer system including a plurality of servers (see, for example, International Publication Pamphlet No. WO2006/046297).

However, such a related-art method of analyzing the server performance using a computer is not designed to efficiently analyze the cause of increase in response times so as to determine, for example, whether the cause is an internal cause or an external cause. Accordingly, an analytical determination is still performed manually using a drill-down method at an early stage of the analysis, and therefore it takes time to identify the cause of increase in response times. As a result, it is difficult to quickly improve the response time of the server.

SUMMARY

According to an aspect of the embodiments, a computer-readable storage medium storing a computer program, the computer program causing an information processing apparatus to perform a procedure includes: extracting from a storage unit, the storage unit storing a plurality of processing period records each including a request input time when an operation request is input to a device under analysis and a response output time when a response resulting from an operation performed in response to the operation request is output from the device under analysis, one or more of the plurality of processing period records corresponding to operations whose response times from the respective request input times to the respective response output times are greater than a threshold; first analyzing, on the basis of the request input times included in the extracted processing period records, variations in input frequency of the operation requests corresponding to the operations whose response times are greater than the threshold; second analyzing, on the basis of the response output times included in the extracted processing period records, variations in output frequency of the responses corresponding to the operations whose response times are greater than the threshold; and determining a cause of occurrence of the operations whose response times are greater than the threshold, on the basis of the variations in input frequency of the operation requests and the variations in output frequency of the responses.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an exemplary data structure in a message data storage unit;

FIG. 18 is a flowchart illustrating a determination pattern of the cause of the responsiveness degradation;

DESCRIPTION OF EMBODIMENTS

Figure 1:
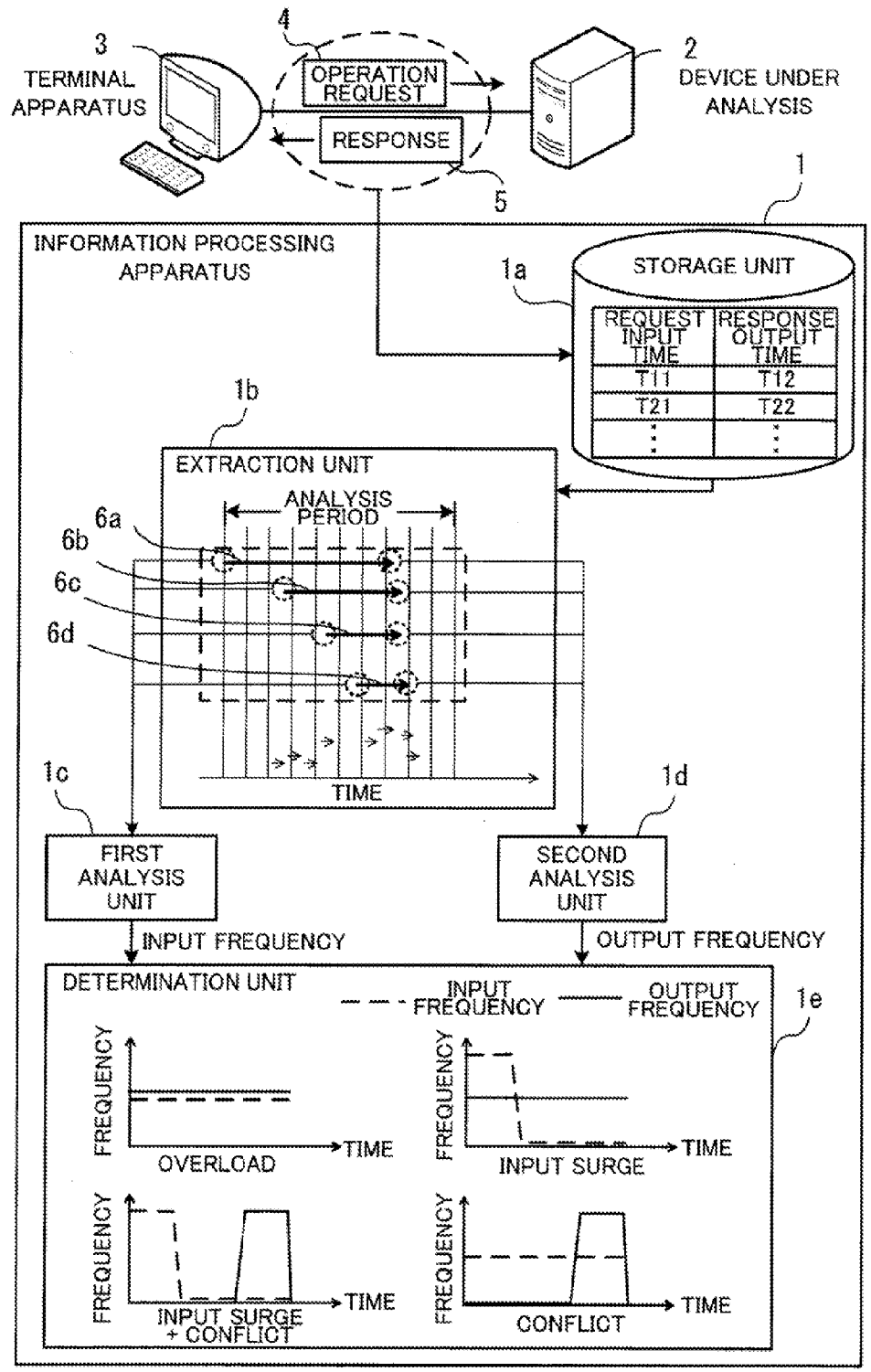
FIG. 1 illustrates an exemplary functional configuration of an apparatus according to a first embodiment.

Several embodiments will be described below with reference to the accompanying drawings, wherein like reference numerals refer to like elements throughout. It is to be understood that one or more of the embodiments may be implemented in combination with one or more of the other embodiments as long as no inconsistency arises.

(A) First Embodiment

First, a description will be given of a first embodiment. The first embodiment is configured to determine the cause of increase in response times of operations performed by a device under analysis. In the first embodiment, an information processing apparatus analyzes, on the basis of operation request input times and response output times of operations whose response times are greater than a predetermined threshold, variations in input frequency of operation requests and variations in output frequency of responses corresponding to only these operations. Accordingly, analysis results are obtained that highlight the conditions causing an increase in response times. Thus, on the basis of the analysis results, the cause of increase in response times is determined.

FIG. 1 illustrates an exemplary functional configuration of an information processing apparatus 1 according to the first embodiment. The information processing apparatus 1 analyzes the cause of increase in response times of operations performed by a device under analysis 2. For example, the information processing apparatus 1 performs analysis on the basis of operation requests 4 that are input from a terminal apparatus 3 to the device under analysis 2, and responses 5 that are output from the device under analysis 2 to the terminal apparatus 3. For performing the analysis, the information processing apparatus 1 includes a storage unit 1a, an extraction unit 1b, a first analysis unit 1c, a second analysis unit 1d, and a determination unit 1e.

The storage unit 1a stores a processing period record for each operation performed by the device under analysis 2. The processing period record includes a request input time when the operation request 4 is input to the device under analysis 2 and a response output time when the response 5 resulting from an operation performed in response to the operation request 4 is output from the device under analysis 2.

The extraction unit 1b extracts, from the storage unit 1a, the processing period records corresponding to the operations whose response times from the respective request input times to the respective response output times are greater than a threshold.

The first analysis unit 1c analyzes, on the basis of the request input times included in the extracted processing period records, the variations in input frequency of the operation requests corresponding to the operations whose response times are greater than the threshold. For example, the first analysis unit 1c selects, as an input type, one of a temporary high level, a constant high level, a constant low level, on the basis of the transition of the state (i.e., high level or low level) of the input frequency of the operation requests. The temporary high level is an input type indicating that the input frequency of operation requests is temporarily at a high level. The constant high level is an input type indicating that the input frequency of operation requests is continuously at a high level. The constant low level is an input type indicating that the input frequency of operation requests is continuously at a low level. The determination of whether the input type is the constant high level or the constant low level may be made on the basis of whether the number of operation requests that are input within a predetermined analysis period is greater than a predetermined value. In this case, when the number of operation requests is greater than the predetermined value, the input type is determined to be the constant high level; and when the number of operation requests is less than or equal to the predetermined value, the input type is determined to be the constant low level.

The second analysis unit 1d analyzes, on the basis of the response output times included in the extracted processing period records, the variations in output frequency of the responses corresponding to the operations whose response times are greater than the threshold. For example, the second analysis unit 1d selects, as an output type, one of a temporary high level, a constant high level, and a constant low level, on the basis of the transition of the state (i.e., high level or low level) of the output frequency of the responses. The temporary high level is an output type indicating that the output frequency of responses is temporarily at a high level. The constant high level is an output type indicating that the output frequency of responses is continuously at a high level. The constant low level is an output type indicating that the output frequency of responses is continuously at a low level. The determination of whether the output type is the constant high level or the constant low level may be made on the basis of whether the number of responses that are output within a predetermined analysis period is greater than a predetermined value. In this case, when the number of responses is greater than the predetermined value, the output type is determined to be the constant high level; and when the number of responses are less than or equal to the predetermined value, the output type is determined to be the constant low level.

The determination unit 1e determines the cause of the occurrence of the operations whose response times are greater than the threshold, on the basis of the variations in input frequency of the operation requests and the variations in output frequency of the responses. For example, the determination unit 1e determines the cause of the occurrence of the operations whose response times are greater than the threshold on the basis of a combination of the input type and the output type. For instance, if the input type is the constant high level and the output type is the constant high level, the determination unit 1e determines that the cause of the occurrence of the operations whose response times are greater than the threshold is an overload. Further, if the input type is the temporary high level and the output type is the constant high level, the determination unit 1e determines that the cause of the occurrence of the operations whose response times are greater than the threshold is a burst of operation requests (i.e., an input surge). Further, if the input type is the constant high level and the output type is the temporary high level, the determination unit 1e determines that the cause of the occurrence of the operations whose response times are greater than the threshold is a conflict over the resources to be used for the operations.

Furthermore, the determination unit 1e may determine that the cause of the occurrence of the operations whose response times are greater than the threshold is a combination of causes. For example, if the input type is the temporary high level and the output type is the temporary high level, the determination unit 1e determines that the cause of the occurrence of the operations whose response times are greater than the threshold is a combination of causes, i.e., a burst of operation requests and a conflict over the resources to be used for the operations.

With the information processing apparatus 1 described above, the cause of increase in response times of the device under analysis 2 may be determined. For instance, in the example illustrated in FIG. 1, among operations performed by the device under analysis 2 within an analysis period to be analyzed, four operations 6a, 6b, 6c, and 6d have response times greater than a threshold. It is to be noted that, in FIG. 1, each operation is indicated by an arrow. The head of the arrow indicates a request input time, while the tail of the arrow indicates a response output time. In the example of FIG. 1, the extraction unit 1b extracts processing period records corresponding to the operations 6a, 6b, 6c, and 6d from the storage unit 1a.

Then, the first analysis unit 1c determines an input type on the basis of request input times of the extracted operations 6a, 6b, 6c, and 6d. In the example of FIG. 1, the request input times are dispersed, and there are not a large number of operation requests. Thus, the input type is determined to be the constant low level. Then, the second analysis unit 1d determines an output type on the basis of response output times of the extracted operations 6a, 6b, 6c, and 6d. In the example of FIG. 1, the response output times are concentrated, and thus the output level is determined to be the temporary high level.

Subsequently, the determination unit 1e determines the cause of the occurrence of the operations whose response times are greater than the threshold. For example, if the input type is a constant low level and the output type is a temporary high level, the determination unit 1e determines that there is a conflict over the resources to be used.

As described above, in the first embodiment, on the basis of only the processing period records corresponding to the operations whose response times are greater than a threshold, the relationship between the input frequency and the output frequency is analyzed, and the cause of increase in response times is determined. Therefore, the cause may be appropriately determined. For example, a performance degradation occurred in a short period of time may be detected. Examples of the causes of increase in response times include an overload, an input surge, a conflict, and a combination of an input surge and a conflict.

Since the cause of increase in response times may be appropriately determined, the response time may be promptly improved. For example, if the cause of increase in response times is an overload, this indicates that the device under analysis 2 has a limited processing capability. Therefore, the hardware resources of the device under analysis 2 may be increased so as to prevent response times of subsequent operations from increasing. Further, if the cause of increase in response times is an input surge, the terminal apparatus 3 may be set such that operation requests to be output from the terminal apparatus 3 are dispersed in time. Thus, the response time may be prevented from increasing.

It is to be noted that the storage unit 1a, the extraction unit 1b, the first analysis unit 1c, the second analysis unit 1d, and the determination unit 1e illustrated in FIG. 1 may be realized as a central processing unit (CPU) of the information processing apparatus 1. Also, the storage unit 1a may be implemented as a random access memory (RAM) or a hard disk drive (HDD) of the information processing apparatus 1.

The lines connecting between the elements illustrated in FIG. 1 are a part of the communication path. The communication path is not limited to the configuration illustrated in FIG. 1, but may include other configurations.

(B) Second Embodiment

Next, a description will be given of a second embodiment. The second embodiment is configured to identify, as the external cause of the responsiveness degradation of a server included in a multi-layer system, an overload and an input surge, and identify an access conflict as the internal cause. The term "overload" as used herein refers to processing load being continuously extremely high. The term "input surge" refers to a temporary increase in the number of requests. The term "conflict" refers to a plurality of operations attempting to use the same resources at the same time.

Figure 2:
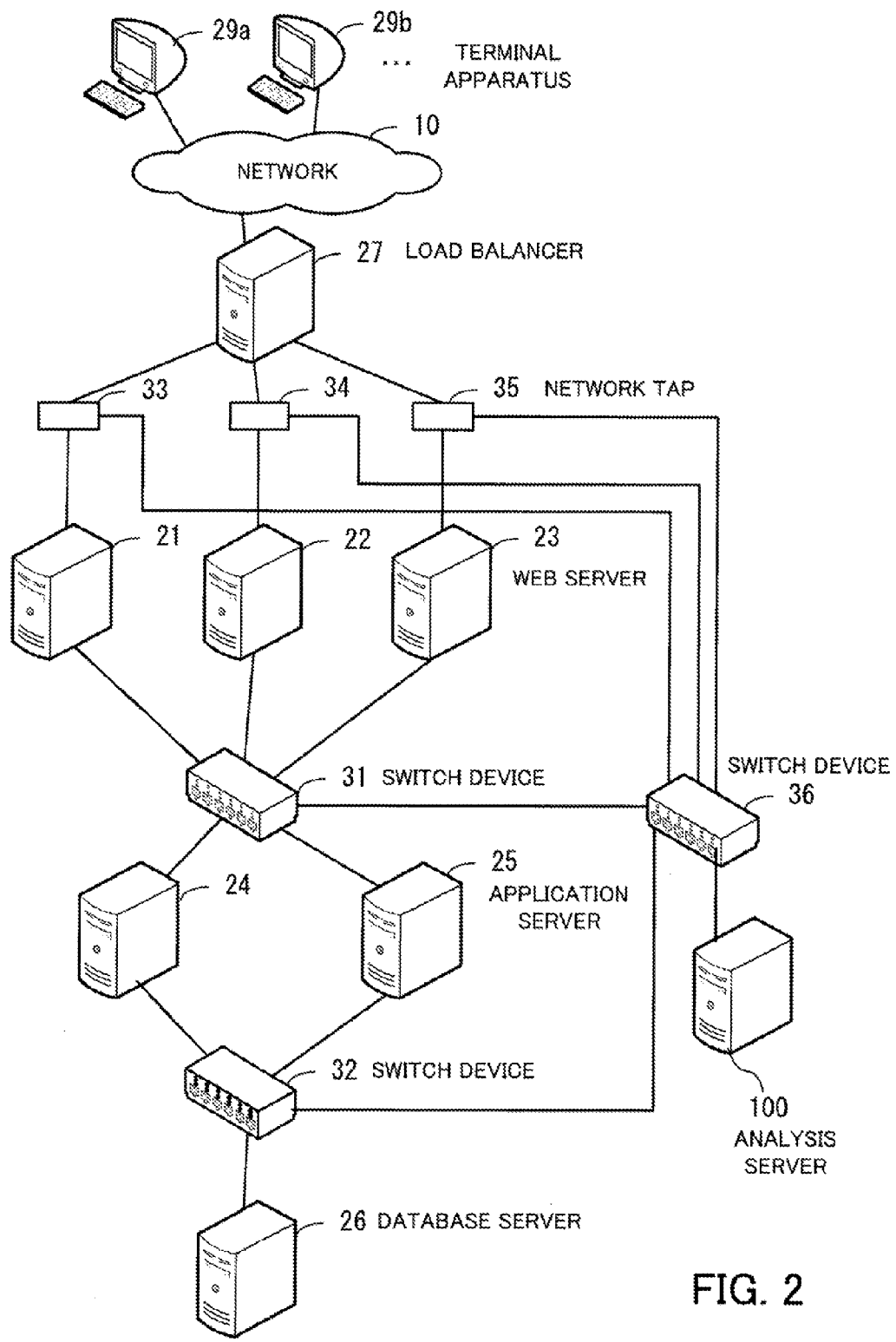
FIG. 2 illustrates the configuration of a system according to a second embodiment.

FIG. 2 illustrates the configuration of a system according to the second embodiment. The system includes an analysis server 100, Web servers 21, 22, and 23, application servers 24 and 25, a database server 26, and a load balancer 27. The Web servers 21, 22, and 23 and the application servers 24 and 25 are connected to each other via a switch device 31. The application servers 24 and 25 and the database server 26 are connected to each other via a switch device 32. The load balancer 27 is connected to each of the Web servers 21, 22, and 23 via network taps 33, 34, and 35, respectively.

The switch devices 31 and 32 have a port mirroring function. The switch devices 31 and 32 have ports for port mirroring, which are connected to a switch device 36. The switch device 31 performs port mirroring so as to make copies of packets that are exchanged between the Web servers 21, 22 and 23 and the application servers 24 and 25 and transmit the copies to the switch devices 36. The switch device 32 performs port mirroring so as to make copies of packets that are exchanged between the application servers 24 and 25 and the database server 26 and transmit the copies to the switch devices 36.

The network taps 33, 34, and 35 have ports for monitoring, which are connected to the switch device 36. The network tap 33 makes copies of packets exchanged between the Web server 21 and the load balancer 27, and transmits the copies to the switch device 36. The network tap 34 makes copies of packets exchanged between the Web server 22 and the load balancer 27, and transmits the copies to the switch device 36. The network tap 35 makes copies of packets exchanged between the Web server 23 and the load balancer 27, and transmits the copies to the switch device 36.

The switch device 36 is connected to the analysis server 100. The switch device 36 transfers, to the analysis server 100, packets that are transmitted from the other switch devices 31 and 32 and the network taps 33, 34, and 35.

The load balancer 27 is connected to terminal apparatuses 29a, 29b, and so on through a network 10. The load balancer 27 transfers, to any of the Web servers 21, 22, and 23, operation requests addressed to the Web servers 21, 22, and 23 from the terminal apparatuses 29a, 29b, and so on. For example, the load balancer 27 distributes the operation requests such that the processing loads of the Web servers 21, 22, and 23 become equal to each other.

The terminal apparatuses 29a, 29b, and so on may access the Web servers 21, 22, and 23 via the network 10 and the load balancer 27. The users of the terminal apparatuses 29a, 29b, and so on may use the system by manipulating, on the terminal apparatuses 29a, 29b, and so on, the graphical user interface (GUI) offered by the Web servers 21, 22, and 23.

The analysis server 100 manages operational statuses of the Web servers 21, 22, and 23, the application servers 24 and 25, and the database server 26. The analysis server 100 may obtain information for managing the operational statuses via the switch device 36. More specifically, the analysis server 100 receives and stores communication packets transmitted from the switch device 36 (packet capture). The analysis server 100 has a network interface capable of receiving IP packets transferred via the switch device 36. The analysis server 100 also has a hard disk with a capacity large enough to store the transferred IP packets. The analysis server 100 preferably has a CPU performance high enough to capture the IP packets. The transferred IP packets are captured by the analysis server 100, and then subjected to processing for extracting a message.

The Web servers 21, 22, and 23 receive operation requests (messages) that are output from the terminal apparatuses 29a, 29b, and so on executing a Web browser. In this embodiment, the message exchange between the Web servers 21, 22, and 23 and the terminal apparatuses 29a, 29b, and so on is performed over HTTP, for example. However, other protocols may alternatively be used.

In the following description, operation requests transmitted from the terminal apparatuses 29a, 29b, and so on to the Web servers 21, 22, and 23 are referred to as "HTTP requests". Also, responses to the HTTP requests are referred to as "HTTP responses".

The Web servers 21, 22, and 23 generate, as for static content, HTTP responses on their own on the basis of the HTTP requests received from the terminal apparatuses 29a, 29b, and so on, and transmit the HTTP responses to the terminal apparatuses 29a, 29b, and so on. As for dynamic content, the Web servers 21, 22, and 23 generate operation requests (messages) indicating operations which the Web servers 21, 22, and 23 are to request the application servers 24 and 25 to perform, and transmit the operation requests to the application servers 24 and 25.

In this embodiment, the message exchange between the Web servers 21, 22, and 23 and the application servers 24 and 25 is performed over Internet Inter-Object Request Broker Protocol (IIOP), for example. However, other protocols may alternatively be used.

The Web servers 21, 22, and 23 having received the IIOP responses with respect to the IIOP requests generate HTTP responses on the basis of the contents of the IIOP responses, and transmit the HTTP responses to the terminal apparatuses 29a, 29b, and so on.

The application servers 24 and 25 generate queries indicating operations which the application servers 24 and 25 are to request the database server 26 to perform, and transmit the queries to the database server 26.

The queries generated by the application servers 24 and 25 are written in SQL, for example, and are transmitted to the database server 26 over the protocol specific to the database server 26. In the following description, the queries transmitted from the application servers 24 and 25 to the database server 26 are referred to as "database requests". Also, responses to the database requests are referred to as "database responses".

The application servers 24 and 25 having received the database responses with respect to the database requests generate IIOP responses on the basis of the contents of the database responses, and transmit the IIOP responses to the Web servers 21, 22, and 23.

The database server 26 executes SQL statements that are contained in the database requests received from the application servers 24 and 25 so as to perform operations such as referring to the database and updating. The database server 26 generates database responses on the basis of the operation results, and transmits the database responses to the application servers 24 and 25.

It is to be noted that, there are several methods to obtain messages exchanged across layers of a Web layer, an application layer, and a database layer. In the second embodiment, information is obtained from IP packets transmitted over the network.

In the following description, the term "individual servers" refer to the Web servers 21, 22, and 23, the application servers 24 and 25, and the database server 26. The Web servers 21, 22, and 23 are on an upper layer than the application servers 24 and 25, and the database server 26. Further, the application servers 24 and 25 are on an upper layer than the database server 26. Information defining this hierarchical relationship is stored in the analysis server 100 in advance.

Figure 3:
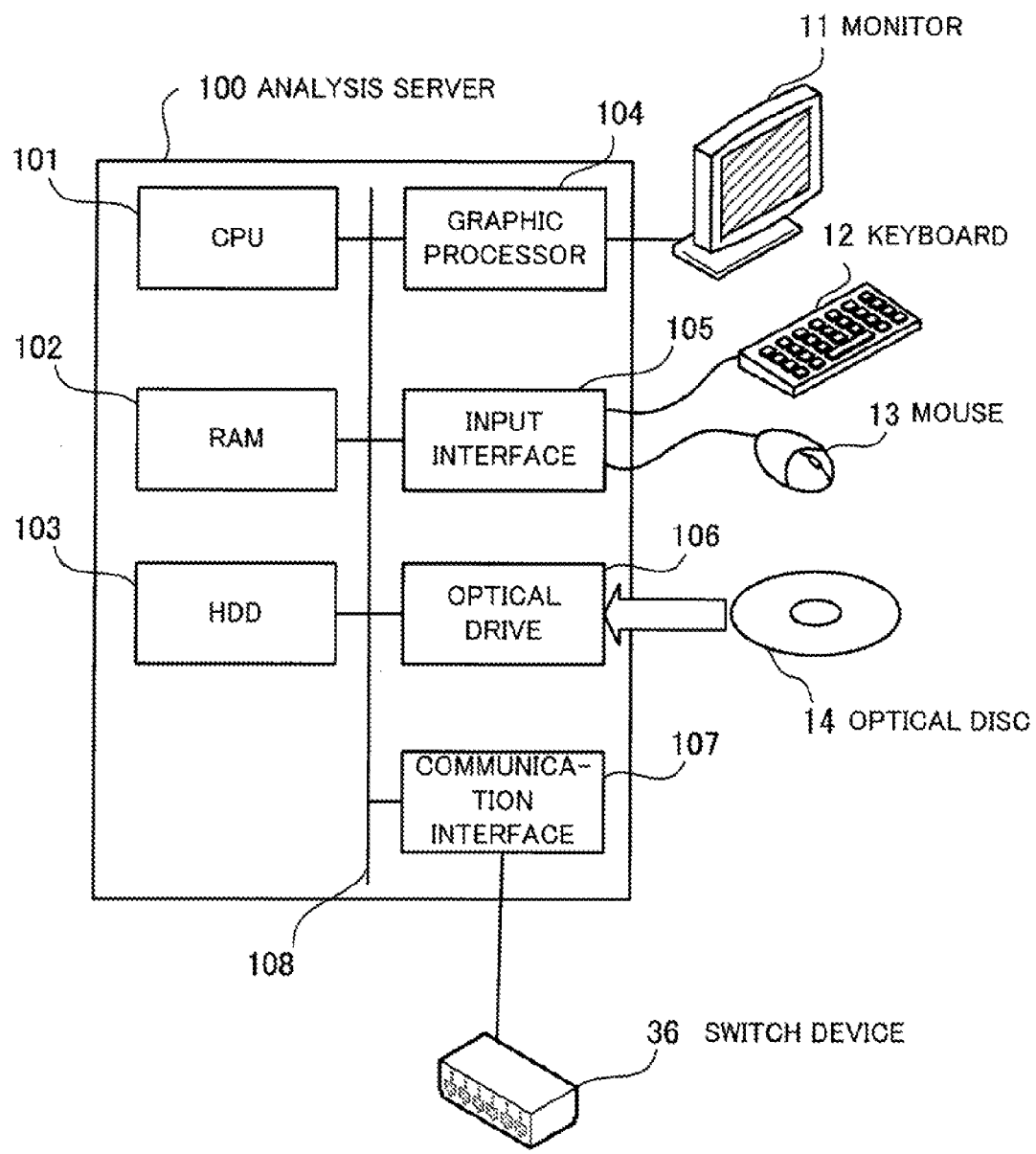
FIG. 3 illustrates an exemplary hardware configuration of an analysis server used in the second embodiment.

FIG. 3 illustrates an exemplary hardware configuration of the analysis server 100 used in the second embodiment. The entire operation of the analysis server 100 is controlled by a CPU 101. The CPU 101 is connected to a RAM 102 and a plurality of peripheral devices via a bus 108. Although the analysis server 100 includes only one CPU in this embodiment, the analysis server may include a plurality of CPUs. In the case where the analysis server 100 includes a plurality of CPUs, the plurality of CPUs operate in combination with each other so as to control the entire operation of the analysis server 100.

The RAM 102 is used as a primary storage device of the analysis server 100. The RAM 102 temporarily stores at least a part of programs of the operating system (OS) and application programs to be executed by the CPU 101. The RAM 102 also stores various types of data to be used for processing by the CPU 101.

The peripheral devices connected to the bus 108 include an HDD 103, a graphic processor 104, an input interface 105, an optical drive 106, and a communication interface 107.

The HDD 103 magnetically writes data to and reads data from a built-in disk. The HDD 103 is used as a secondary storage device of the analysis server 100. The HDD 103 stores OS programs, application programs, and various types of data. It is to be noted that a semiconductor storage device such as a flash memory may alternatively be used as a secondary storage device.

The graphic processor 104 is connected to a monitor 11. The graphic processor 104 displays images on the screen of the monitor 11 in accordance with a command from the CPU 101. Examples of the monitor 11 include a display device using a cathode ray tube (CRT) and a liquid crystal display device.

The input interface 105 is connected to a keyboard 12 and a mouse 13. The input interface 105 receives signals from the keyboard 12 and the mouse 13, and transmits the received signals to the CPU 101. It is to be noted that the mouse 13 is an example of a pointing device, and other types of pointing devices may also be used. Examples of other types of pointing devices include a touch panel, a tablet, a touch pad, and a track ball.

The optical drive 106 reads data from an optical disc 14 with use of laser beams or the like. The optical disc 14 is a portable storage medium that stores data such that the data may be read through optical reflection. Examples of the optical disc 14 include a digital versatile disc (DVD), a DVD-RAM, a compact disc read only memory (CD-ROM), a CD-Recordable (CD-R), and a CD-Rewritable (CD-RW).

The communication interface 107 is connected to the switch device 36. The communication interface 107 exchanges data between other servers and communication apparatuses via the switch device 36.

The processing functions of the second embodiment may be realized with the hardware configuration described above. Although the hardware configuration of the analysis server 100 is illustrated in FIG. 3, the Web servers 21, 22, and 23, the application servers 24 and 25, the database server 26, and the plurality of the terminal apparatuses 29a, 29b, and so on may be realized with the same hardware configuration as the analysis server 100. Also, the information processing apparatus 1 of the first embodiment may be realized with the same hardware configuration as the analysis server 100 of FIG. 3.

Figure 4:
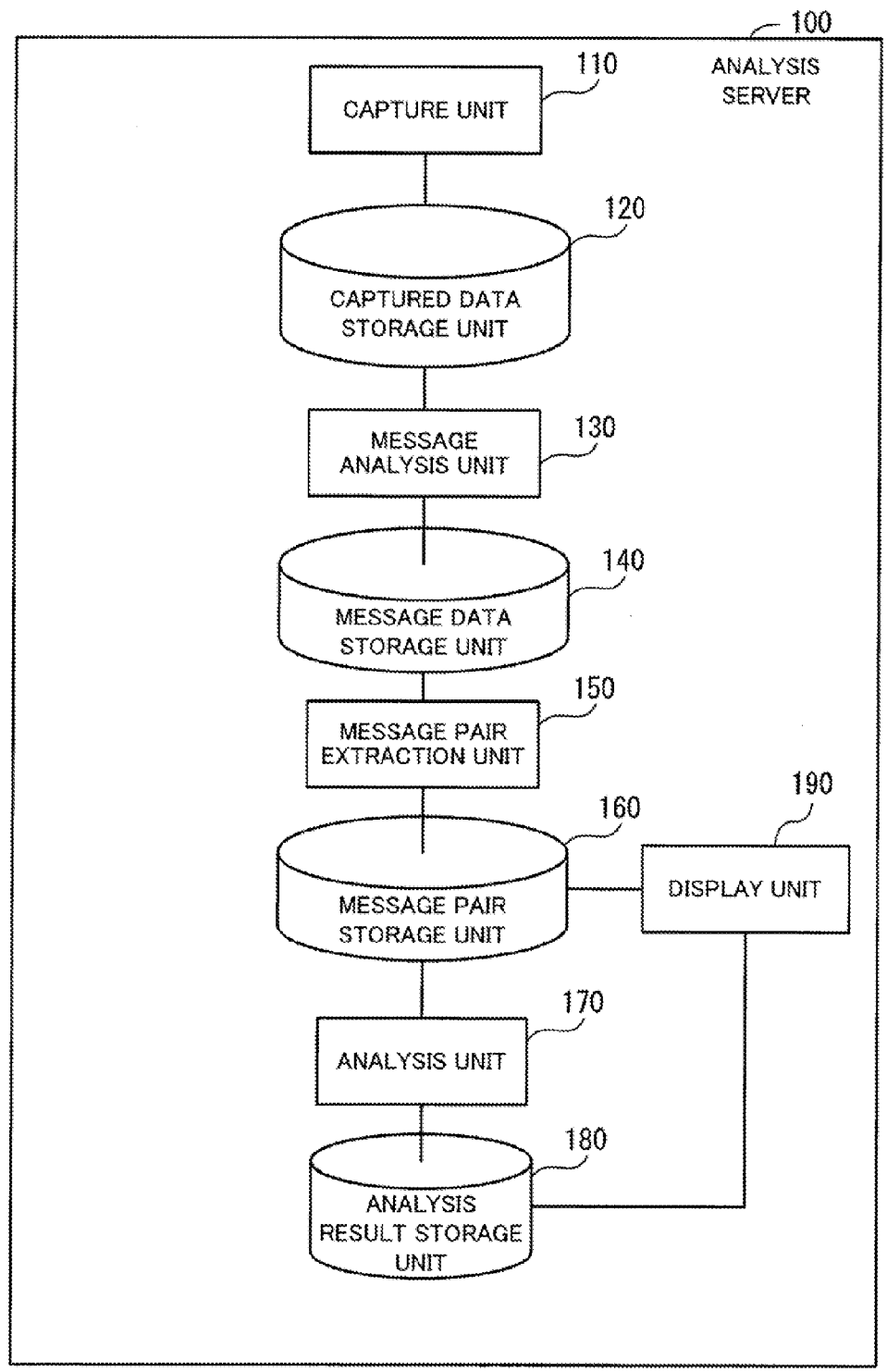
FIG. 4 is an exemplary functional block diagram of the analysis server according to the second embodiment.

FIG. 4 is an exemplary functional block diagram of the analysis server 100 according to the second embodiment. The analysis server 100 includes a capture unit 110, a captured data storage unit 120, a message analysis unit 130, a message data storage unit 140, a massage pair extraction unit 150, a message pair storage unit 160, an analysis unit 170, an analysis result storage unit 180, and a display unit 190.

The capture unit 110 receives communication packets output from the mirror ports of the switch devices 31 and 32 or the network taps 33 through 35 via the switch device 36. The capture unit 110 stores the received communication packets in the captured data storage unit 120. In this step, for example, the capture unit 110 attaches information (time stamp) indicating the current time to each of the communication packets to be stored, and stores communication packet information with the time information the time information attached thereto in the captured data storage unit 120.

The captured data storage unit 120 stores the communication packets stored by the capture unit 110. For example, a part of the storage area of the RAM 102 or the HDD 103 of the analysis server 100 is used as the captured data storage unit 120.

The message analysis unit 130 analyzes the received packets, and reconstructs messages exchanged between the Web servers 21, 22, and 23, the application servers 24 and 25, the database server 26, and the terminal apparatuses 29a, 29b, and so on. Then, the message analysis unit 130 stores the reconstructed messages in the message data storage unit 140.

The message data storage unit 140 stores the reconstructed messages. For example, a part of the storage area of the RAM 102 or the HDD 103 is used as the message data storage unit 140.

The message pair extraction unit 150 extracts, from the message data storage unit 140, a pair of a request message and a response message with respect to the request message. Then, the message pair extraction unit 150 stores the extracted message pair in the message pair storage unit 160.

The message pair storage unit 160 stores the message pair. For example, a part of the storage area of the RAM 102 or the HDD 103 is used as the message pair storage unit 160. It is to be noted that the message pair storage unit 160 is an example of the storage unit 1a of the first embodiment illustrated in FIG. 1.

The analysis unit 170 analyzes the cause of the responsiveness degradation on the basis of the message pairs stored in the message pair storage unit 160. For example, the analysis unit 170 specifies the cause of the responsiveness degradation in the case where any of the causes of the responsiveness degradation, namely, overload, input surge, access conflict, or a combination of two or more of these causes is present. The analysis unit 170 stores the analysis results in the analysis result storage unit 180. It is to be noted that the analysis unit 170 is an example of an function incorporating the extraction unit 1b, the first analysis unit 1c, the second analysis unit 1d, and the determination unit 1e of the first embodiment illustrated in FIG. 1.

The analysis result storage unit 180 stores the analysis results. For example, a part of the storage area of the RAM 102 or the HDD 103 is used as the analysis result storage unit 180.

The display unit 190 visually and graphically displays the status of the response time on the basis of the message pairs stored in the message pair storage unit 160. For example, the display unit 190 displays a scatter diagram illustrating response times of the respective message pairs over the course of time. The display unit 190 may display the analysis results stored in the analysis result storage unit 180.

It is to be noted that the lines connecting between the elements illustrated in FIG. 4 are a part of the communication path. The communication path is not limited to the configuration illustrated in FIG. 4, but may include other configurations.

The following describes analysis processing by the analysis server 100 having the configuration described above.

Figure 5:
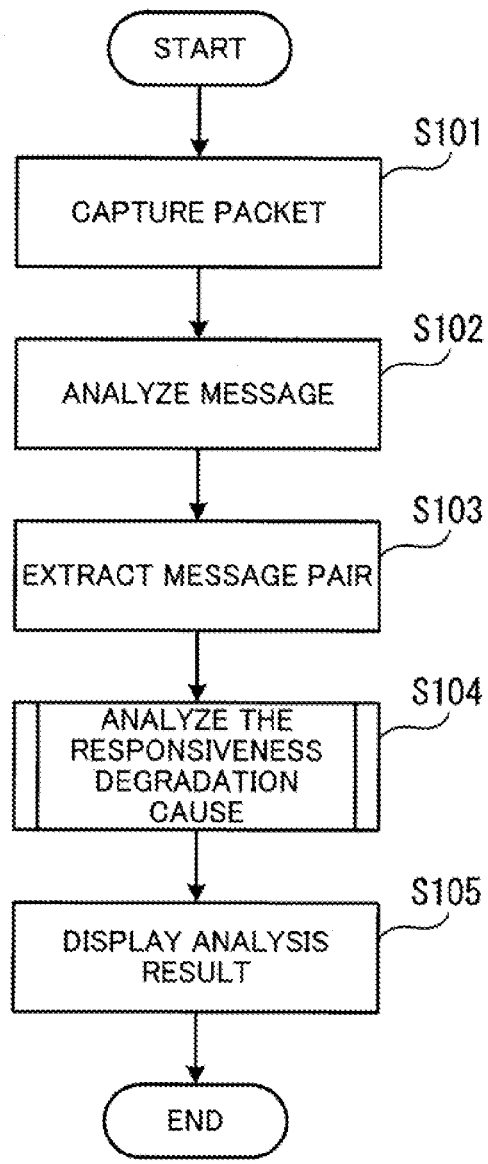
FIG. 5 is a flowchart illustrating the procedure of analysis processing.

FIG. 5 is a flowchart illustrating the procedure of analysis processing. In the following, the processing of FIG. 5 is described in order of step number.

(Step S101) The capture unit 110 captures packets that are input to or output from the Web servers 21 through 23, the application servers 24 and 25, and the database server 26. For example, the capture unit 110 obtains packets that are copied by the switch devices 31 and 32 and the network taps 33 through 35, via the switch device 36. The capture unit 110 attaches time stamps to the captured packets, and stores the packets in the captured data storage unit 120.

(Step S102) The message analysis unit 130 reconstructs messages on the basis of the packets stored in the captured data storage unit 120. The messages to be reconstructed include request messages and response messages. Then, the message analysis unit 130 stores the reconstructed messages in the message data storage unit 140.

(Step S103) The message pair extraction unit 150 generates a message pairs each including a message input to and a message output from a server to be analyzed. It is to be noted that the server to be analyzed is specified in advance. For example, in the case where the database server 26 is to be analyzed, the message pair extraction unit 150 extracts, from the messages stored in the message data storage unit 140, request messages addressed to the database server 26 and response messages originating from the database server 26. Then, the message pair extraction unit 150 correlates a request message to a response message with respect to the request message, among the extracted messages, so as to generate a message pair. For example, the message pair extraction unit 150 correlates a request message with a session number assigned thereto to a response message with the same session number assigned thereto so as to generate a message pair. The message pair extraction unit 150 stores the extracted message pair in the message pair storage unit 160.

(Step S104) The analysis unit 170 analyzes message pairs stored in the message pair storage unit 160 so as to analyze whether a responsiveness degradation period is present. If a responsiveness degradation period is present, the analysis unit 170 analyzes the cause of the responsiveness degradation in that period. For example, the analysis unit 170 extracts message pairs whose response times are equal to or greater than a predetermined threshold, and performs analysis using the extracted message pairs. Then, the analysis unit 170 stores the analysis results in the analysis result storage unit 180. It is to be noted that this processing will be described below in greater detail (see FIG. 10).

(Step S105) The display unit 190 displays, on the monitor 11 or the like, the analysis results stored in the analysis result storage unit 180.

Next, information stored in each storage unit of FIG. 5 will be described in detail.

Figure 6:
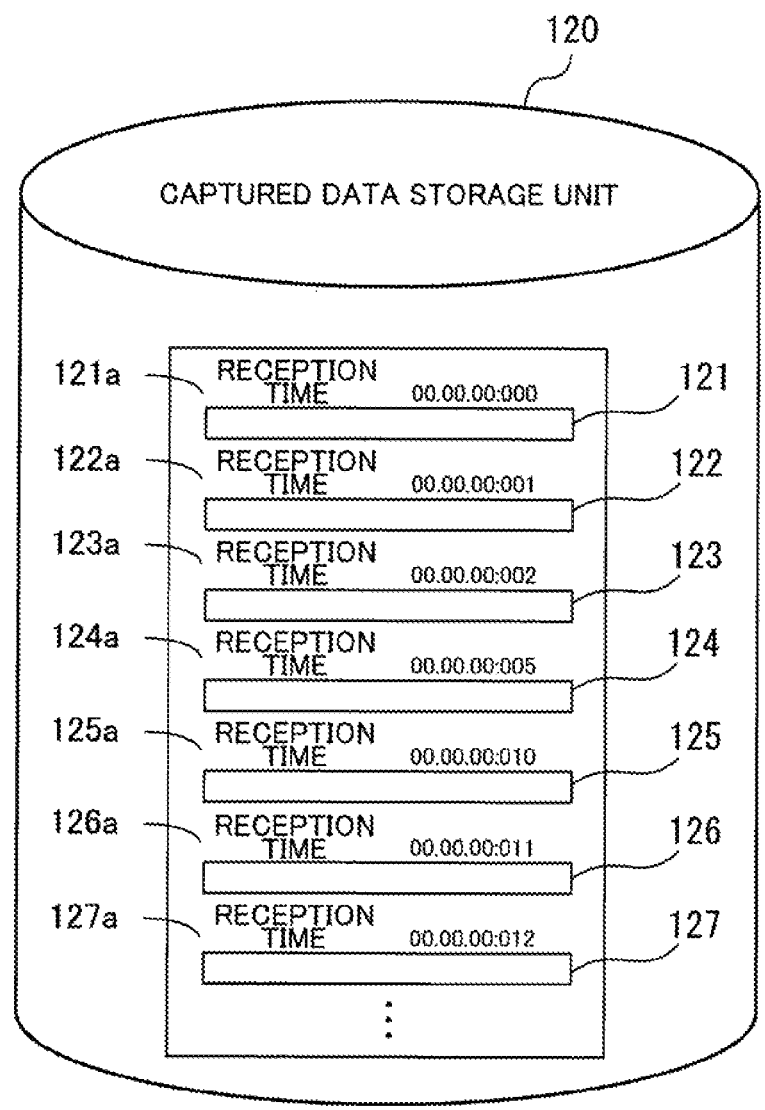
FIG. 6 illustrates an exemplary data structure in a captured data storage unit.

FIG. 6 illustrates an exemplary data structure in the captured data storage unit 120. The captured data storage unit 120 stores a plurality of packets 121, 122, 123, 124, 125, 126, 127, and so on. Further, time stamps 121a, 122a, 123a, 124a, 125a, 126a, 127a, and so on, each indicating a reception time, are attached to the respective packets 121, 122, 123, 124, 125, 126, 127, and so on.

The message analysis unit 130 reconstructs messages on the basis of the captured packets, and stores the messages in the message data storage unit 140.

FIG. 7 illustrates an exemplary data structure in the message data storage unit 140. The message data storage unit 140 stores the plurality of reconstructed messages in chronological order. The messages arranged in chronological order serve as time series data. In FIG. 7, a row number in the message data storage unit 140 is placed at the left side of each message. It is to be noted that, messages in the message data storage unit 140 other than the messages related to operation requests and responses exchanged across the layers are not illustrated.

The message stored in each row includes a date filed 141, a time field 142, a session number field 143, a source address field 144, a destination address field 145, a command type field 146, and a message field 147.

The date field 141 indicates the date on which the message is captured.

The time field 142 indicates the time when the message is captured.

The session number field 143 indicates the session number for managing resources to be used for transmitting and receiving the message in a business system.

The source address field 144 indicates the IP address and the port number of the server from which the message is transmitted.

The destination address field 145 indicates the IP address and the port number of the server to which the message is transmitted.

The command type field 146 indicates the request or response attribute of the command and the type of the protocol (e.g., HTTP, IIOP, a protocol for database query).

The message field 147 indicates the message contents of the request or the like indicated in the command type field 146.

By referring to these messages in the message data storage unit 140, it is possible to detect which message is transmitted to which server.

The corresponding relationships between the IP addresses in the messages stored in the message data storage unit 140 and the apparatuses are as follows.

The address "194.23.5.226" indicates the IP address of the Web server 21; "194.23.7.168" indicates the IP address of the application server 24; "194.23.7.168" indicates the IP address of the database server 26; and "194.185.39.24" indicates the IP address of the terminal apparatus 29a.

It is to be noted that although the time stamp indicating the time when the capture unit 110 captured the communication packet is set as the information in the date field 141 and the time field 142, other information may alternatively be set. For example, in the case where each communication packet contains information indicating the time when the packet is created by each of the individual servers or information indicating the time when the packet is transmitted by each of the individual servers, such information may be used as the information in the date field 141 and the time field 142. In this case, it is preferable that the time be accurately synchronized between the individual servers.

The message pairs each including a message input to and a message output from the server to be analyzed are extracted from the messages stored in the message data storage unit 140, and are stored in the message pair storage unit 160.

Figure 8:
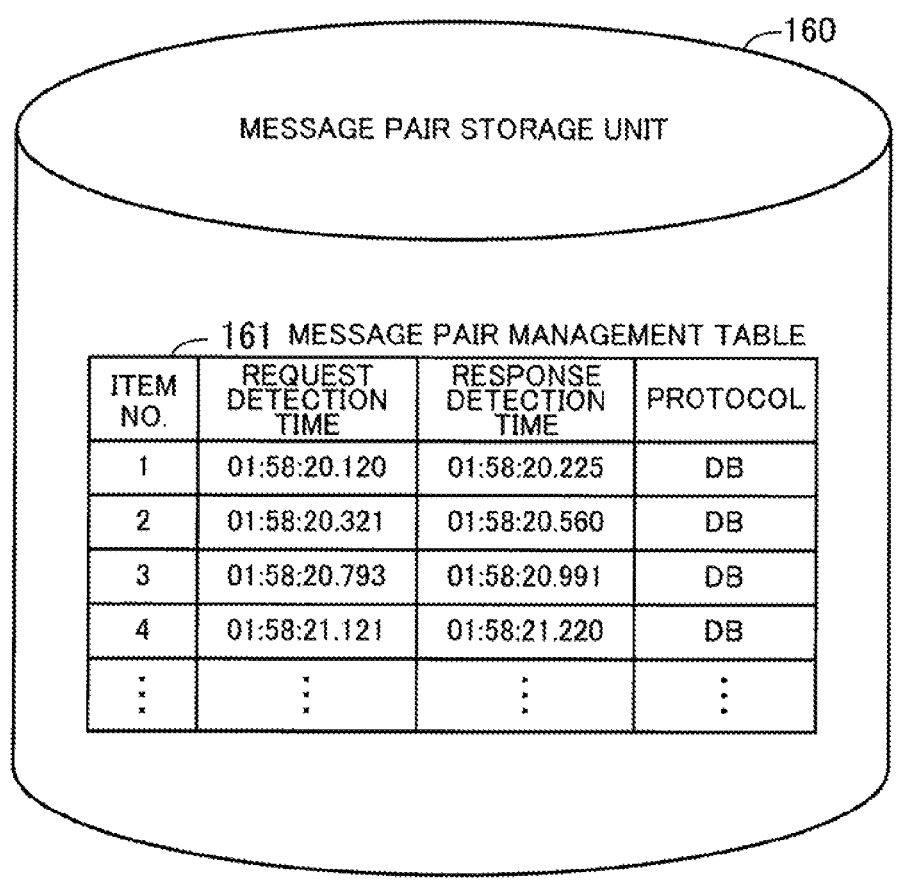
FIG. 8 illustrates an exemplary data structure in a message pair storage unit.

FIG. 8 illustrates an exemplary data structure in the message pair storage unit 160. The message pairs illustrated in the example of FIG. 8 are obtained in the case where the database server 26 is to be analyzed. The message pair storage unit 160 stores a message pair management table 161. The message pair management table 161 has columns for the item number, the request detection time, the response detection time, and the protocol.

The column for item number indicates the identification number of the message pair.

The column for request detection time indicates the detection time of the request message contained in the message pair.

The column for response detection time indicates the detection time of the response message contained in the message pair.

The column for protocol indicates the protocol of the messages contained in the message pair.

The cause of the responsiveness degradation of the server is analyzed on the basis of these message pairs. The analysis results are stored in the analysis result storage unit 180.

Figure 9:
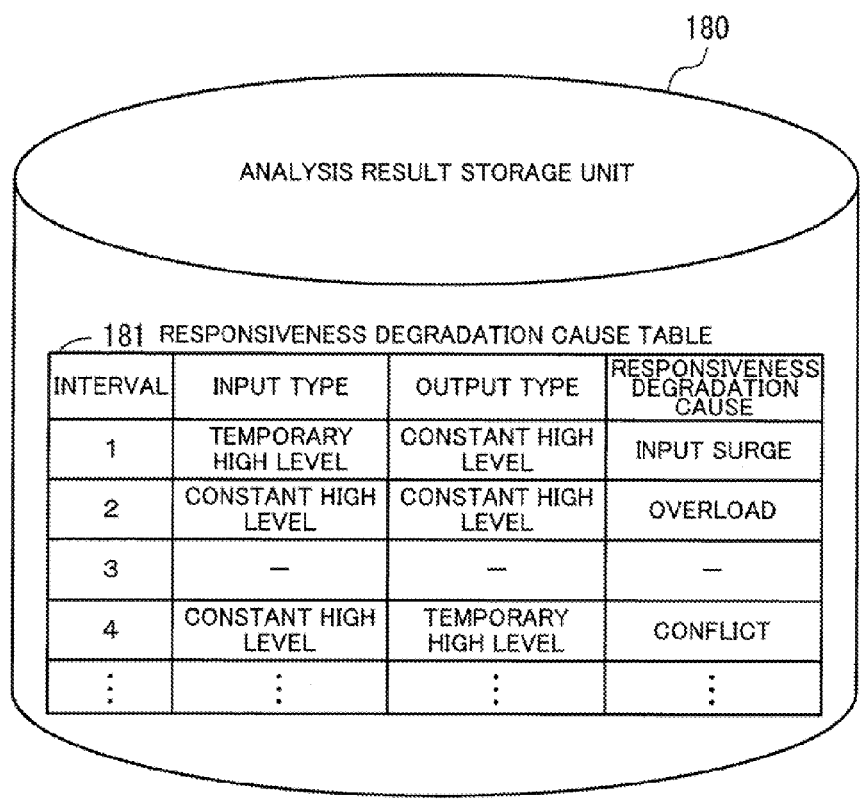
FIG. 9 illustrates an exemplary data structure in an analysis result storage unit.

FIG. 9 illustrates an exemplary data structure in the analysis result storage unit 180. The analysis result storage unit 180 stores a responsiveness degradation cause table 181. The responsiveness degradation cause table 181 has columns for the interval, the input type, the output type, and the responsiveness degradation cause.

The column for the interval indicates the identification number of the time interval (period) over which the cause of the responsiveness degradation is analyzed.

The column for the input type indicates the input type in the case where degradation of the responsiveness is detected during the interval. Examples of input types include a constant low level, a constant high level, and a temporary high level. The constant low level is an input type indicating that the amount of request messages in the message pairs whose response times are equal to or greater than a predetermined threshold is at a low level throughout the interval. The constant high level is an input type indicating that the amount of request messages in the message pairs whose response times are equal to or greater than the predetermined threshold is at a high level throughout the interval. The temporary high level is an input type indicating that the amount of request messages in the message pairs whose response times are equal to or greater than the predetermined threshold is temporarily at a high level, but is at a low level at other times during the interval.

The column for the output type indicates the output type in the case where degradation of the responsiveness is detected during the interval. Examples of output types include a constant low level, a constant high level, and a temporary high level. The constant low level is an output type indicating that the amount of response messages of the message pairs whose response times are equal to or greater than a predetermined threshold is at a low level throughout the interval. The constant high level is an output type indicating that the amount of response messages of the message pairs whose response times are equal to or greater than the predetermined threshold is at a high level throughout the interval. The temporary high level is an output type indicating that the amount of response messages of the message pairs whose response times are equal to or greater than the predetermined threshold is temporarily at a high level, but is at a low level at other times during the interval.

The column for the responsiveness degradation cause indicates the cause of the responsiveness degradation in the case where degradation of the responsiveness is detected during the interval. Examples of the causes of the responsiveness degradation include an overload, an input surge, a conflict, and a combination of two or more of these causes.

Next, the procedure of analysis processing will be described in detail. In the analysis processing, the following parameters are set in advance.

$\Delta T$: analysis time length (positive number)

THR: response threshold (positive integer)

A: dilution parameter (integer greater than 1 (e.g., around 2 to 3))

C: frequency margin parameter (integer greater than 1 (e.g., around 2 to 3))

The analysis time length $\Delta T$ is the length of the interval over which the cause of the responsiveness degradation is analyzed. An observation period is divided into a plurality of intervals of the analysis time length $\Delta T$. The analysis is performed over each of the obtained intervals.

The response threshold THR is a threshold for determining whether the response time is good. If the processing time of the operations corresponding to a message pair is greater than the time specified by the response threshold, the responsiveness of the operation corresponding to the message pair determined to be bad.

The dilution parameter A is a parameter used for determining, upon further dividing the interval to be analyzed into sub-periods, the length of the sub-period. As the value of the dilution parameter A increases, the length of the sub-period decreases.

The frequency margin parameter C is a parameter used for determining the degree of concentration of request messages or response messages. More specifically, if the detection times of request messages or response messages are concentrated in a certain sub-period, the degree of concentration is determined to be a temporary high level. As the frequency margin parameter C increases, the degree of the concentration of messages needed for being determined to be a temporary high level increases.

Figure 10:
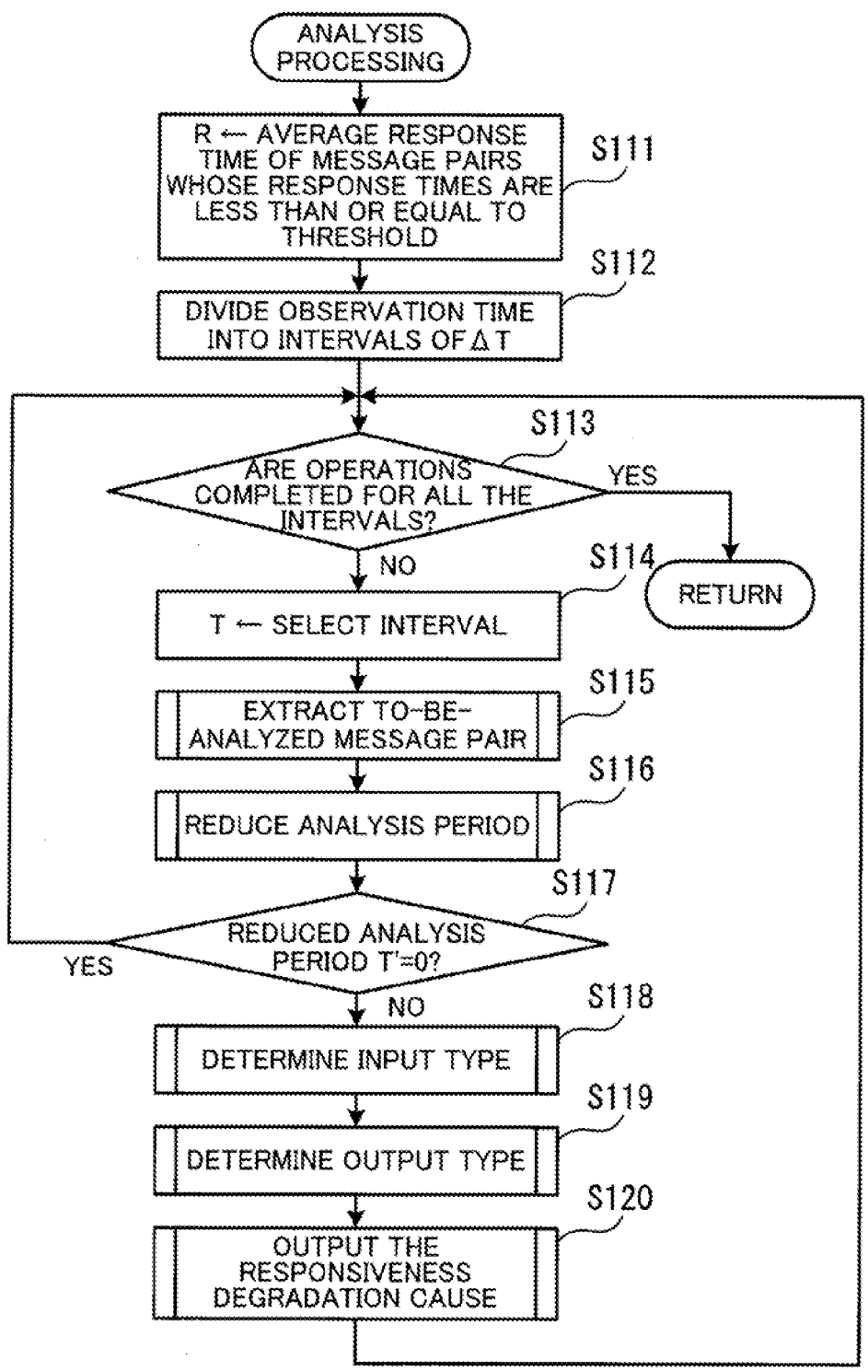
FIG. 10 is a flowchart illustrating an exemplary procedure of analysis processing.

FIG. 10 is a flowchart illustrating an exemplary procedure of analysis processing. In the following, the processing of FIG. 10 is described in order of step number.

(Step S111) The analysis unit 170 calculates an average response time of message pairs whose response times are less than or equal to the response threshold THR, and sets the calculation result as R. For example, the analysis unit 170 calculates a response time of each message pair registered in the message pair management table 161. The response time is a value obtained by subtracting the request detection time from the response detection time, for example. Subsequently, the analysis unit 170 compares the response time of each message pair to the response threshold THR. Then, the analysis unit 170 extracts message pairs whose response times are less than or equal to the response threshold THR from the message pair storage unit 160. Then, the analysis unit 170 calculates the average of the response times of the extracted message pairs, and sets the calculation result as R.

(Step S112) The analysis unit 170 divides the period over which the observation by packet capture is made into intervals of the analysis time length $\Delta T$. Identification numbers in ascending order starting from 1 are assigned to the divided intervals.

(Step S113) The analysis unit 170 determines, for each of the intervals resulting from the division, whether the operations of Step S113 through Step S122 are performed. If these operations are completed for all the intervals, the analysis processing ends. If there is one or more unprocessed intervals, the process proceeds to Step S114.

(Step S114) The analysis unit 170 selects one of the unprocessed intervals, and sets the identification number of the selected interval to T.

(Step S115) The analysis unit 170 extracts message pairs corresponding to the operations performed in the interval of the identification number T as to-be-analyzed message pairs. This processing will be described below in greater detail (see FIG. 11).

(Step S116) The analysis unit 170 performs analysis period reduction processing. The analysis period reduction processing excludes a period within the interval in which an operation whose response time is greater than the threshold is not performed from the period to be analyzed. The analysis unit 170 sets the length of the reduced analysis period as T'. This processing will be described below in greater detail (see FIG. 13).

(Step S117) The analysis unit 170 determines whether T' is 0. When T' is 0, the all the operations performed in the selected interval T are completed in time less than or equal to the response threshold THR, which indicates that there is no degradation of the responsiveness. Therefore, if the analysis unit 170 determines that T' is 0, the process skips responsiveness degradation cause analysis processing (Steps S118 through S122) and proceeds to Step S113. On the hand, if the analysis unit 170 determines that T' is not 0, the process proceeds to Step S118.

(Step S118) The analysis unit 170 performs input type determination processing on the basis of the message pairs extracted in Step S115. This processing will be described below in greater detail (see FIG. 15).

(Step S119) The analysis unit 170 performs output type determination processing on the basis of the message pairs extracted in Step S115. This processing will be described below in greater detail (see FIG. 16).

(Step S120) The analysis unit 170 performs responsiveness degradation cause output processing on the basis of the determined input type and output type. This processing will be described below in greater detail (see FIG. 17). When the responsiveness degradation cause output processing ends, the process proceeds to Step S113.

In this manner, determination of whether there is a responsiveness degradation and, in the case where there is a responsiveness degradation, determination of the cause of the responsiveness degradation are performed for each of the intervals.

Figure 11:
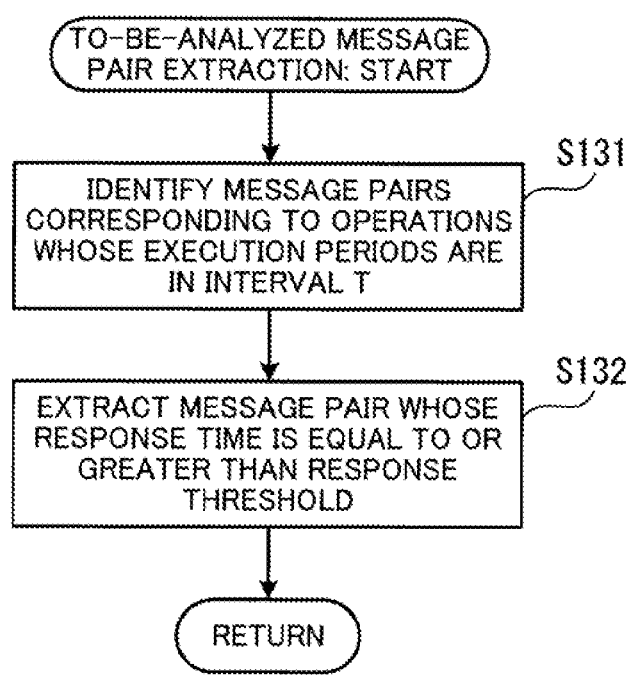
FIG. 11 is a flowchart illustrating an exemplary procedure of to-be-analyzed message pair extraction processing.

FIG. 11 is a flowchart illustrating an exemplary procedure of to-be-analyzed message pair extraction processing. In the following, the processing of FIG. 11 is described in order of step number.

(Step S131) The analysis unit 170 identifies message pairs corresponding to operations whose execution periods are in the interval T.

(Step S132) The analysis unit 170 extracts, out of the message pairs extracted in Step S131, message pairs whose response times are equal to or greater than the response threshold THR as to-be-analyzed message pairs.

Figure 12:
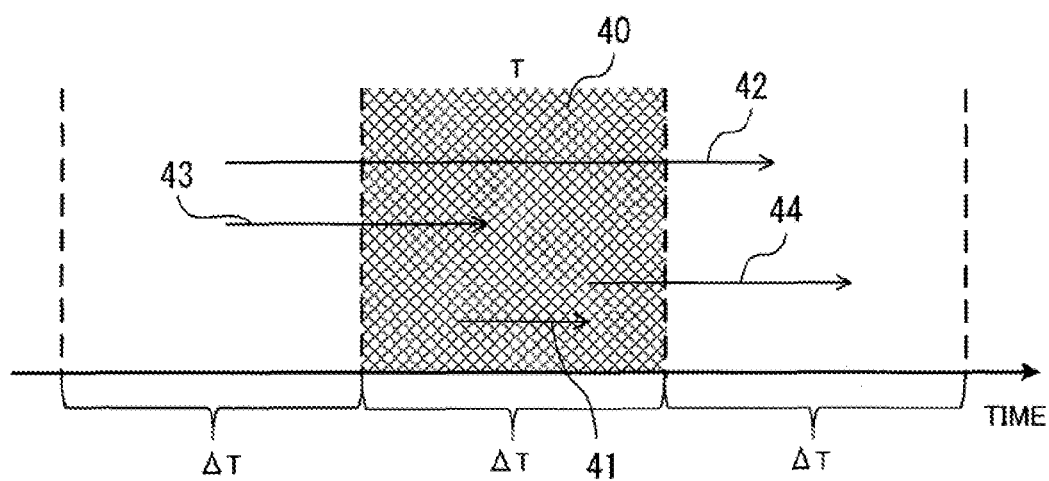
FIG. 12 illustrates an example of extracting a to-be-analyzed message pair.

FIG. 12 illustrates an example of extracting a to-be-analyzed message pair. In FIG. 12, the observation period is divided into intervals of time length ΔT, and message pairs 41 through 44 are to be extracted as to-be-analyzed message pairs in an interval 40 of the identification number T. The period from the detection time of a response message to the detection time of a response message of each of the message pairs 41 through 44 is indicated by an arrow.

For example, the message pair 41 whose request message detection time and response message detection time are both in the interval 40 is extracted as a to-be-analyzed message pair. Further, the message pair 42 whose request message detection time is before the interval 40 and whose response message detection time is after the interval 40 is extracted as a to-be-analyzed message pair. Also, the message pair 43 whose request message detection time is before the interval 40 and whose response message detection time is in the interval 40 is extracted as a to-be-analyzed message pair. Further, the message pair 44 whose request message detection time is in the interval 40 and whose response message detection time is after the interval 40 is extracted as a to-be-analyzed message pair.

In this manner, a message pair is extracted if at least a part of the period from the detection time of a request message thereof to the detection time of a response message thereof is in the interval 40 to be analyzed.

Next, the analysis period reduction processing will be described in detail.

Figure 13:
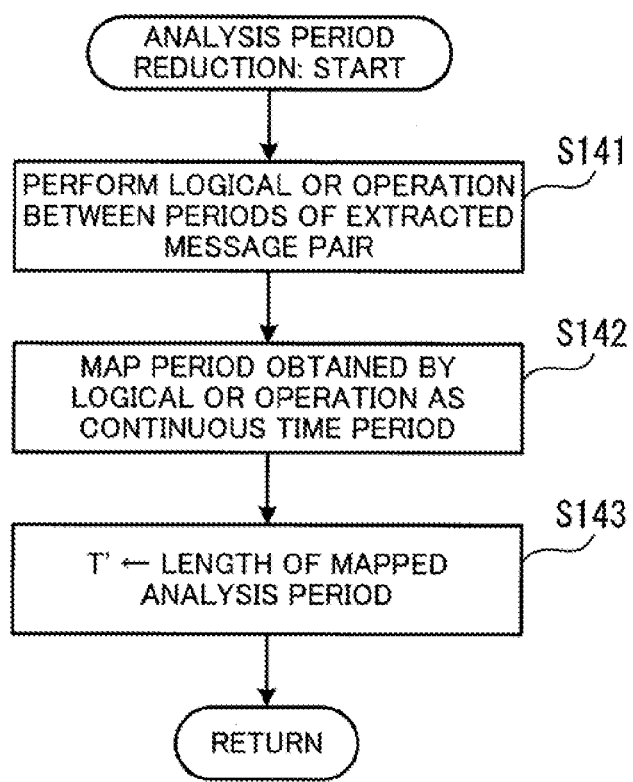
FIG. 13 is a flowchart illustrating an exemplary procedure of analysis period reduction processing.

FIG. 13 is a flowchart illustrating an exemplary procedure of analysis period reduction processing. In the following, the processing of FIG. 13 is described in order of step number.

(Step S141) The analysis unit 170 performs a logical OR operation between the execution periods of operations corresponding to the extracted message pairs. The execution period of an operation corresponding to a message pair is a period from the detection time of a request message thereof to the detection time of a response message thereof.

(Step S142) The analysis unit 170 maps the period obtained by the logical OR operation as a continuous time period.

(Step S143) The analysis unit 170 sets the length of the mapped analysis period as T'.

Figure 14:
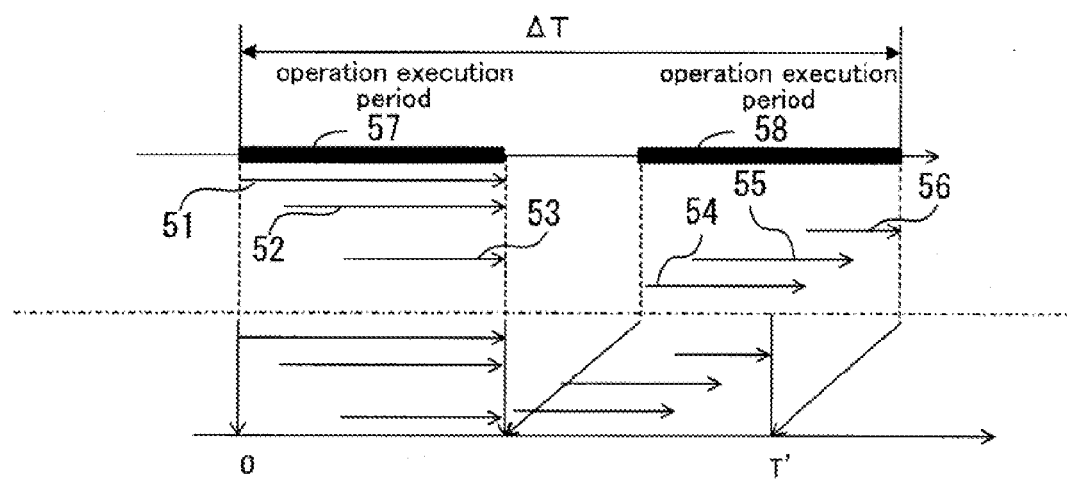
FIG. 14 illustrates an example of analysis period reduction processing.

FIG. 14 illustrates an example of analysis period reduction processing. In the example of FIG. 14, six message pairs 51 through 56 are present in the interval of ΔT. Each of the message pairs 51 through 56 is indicated by an arrow. The head of the arrow indicates the detection time of a request message, while the tail of the arrow indicates the detection time of a response message. In other words, the arrow of each message pair indicates the execution period of an operation performed by a server in response to a request message of the message pair.

The logical OR among the execution periods of the operations corresponding to the message pairs 51 through 53 is a continuous execution period 57. Similarly, the logical OR among the execution periods of the operations corresponding to the message pairs 54 through is a continuous execution period 58. Between the execution period 57 and the execution period 58, there is a blank period in which no operation is performed. This blank period is a period in which there is no message pair corresponding to an operation whose processing time is equal to or greater than the response threshold. Then, the operation execution periods 57 and 58 are mapped to a time axis as a continuous time period. The length of the mapped time period is T'.

As described above, since the blank period is excluded before determining the input type and the output type, the accuracy of the determination of the cause of the responsiveness degradation may be improved. More specifically, upon determining the input type or the output type, the mapped time period is further divided into sub-periods. Then, the input type or the output type is determined using the proportion of the sub-periods containing a request message or a response message. In this processing, if a sub-period irrelevant to degradation of the responsiveness is included in the period to be analyzed, the determination results vary depending on whether such a sub-period is present. This might result in a loss of accuracy in the determination. In other words, if the blank period is excluded from the period to be analyzed before determining the input type or the output type, it may be possible to perform determination at a high accuracy using only the periods relevant to degradation of the responsiveness.

Next, the input type determination processing will be described in detail.

Figure 15:
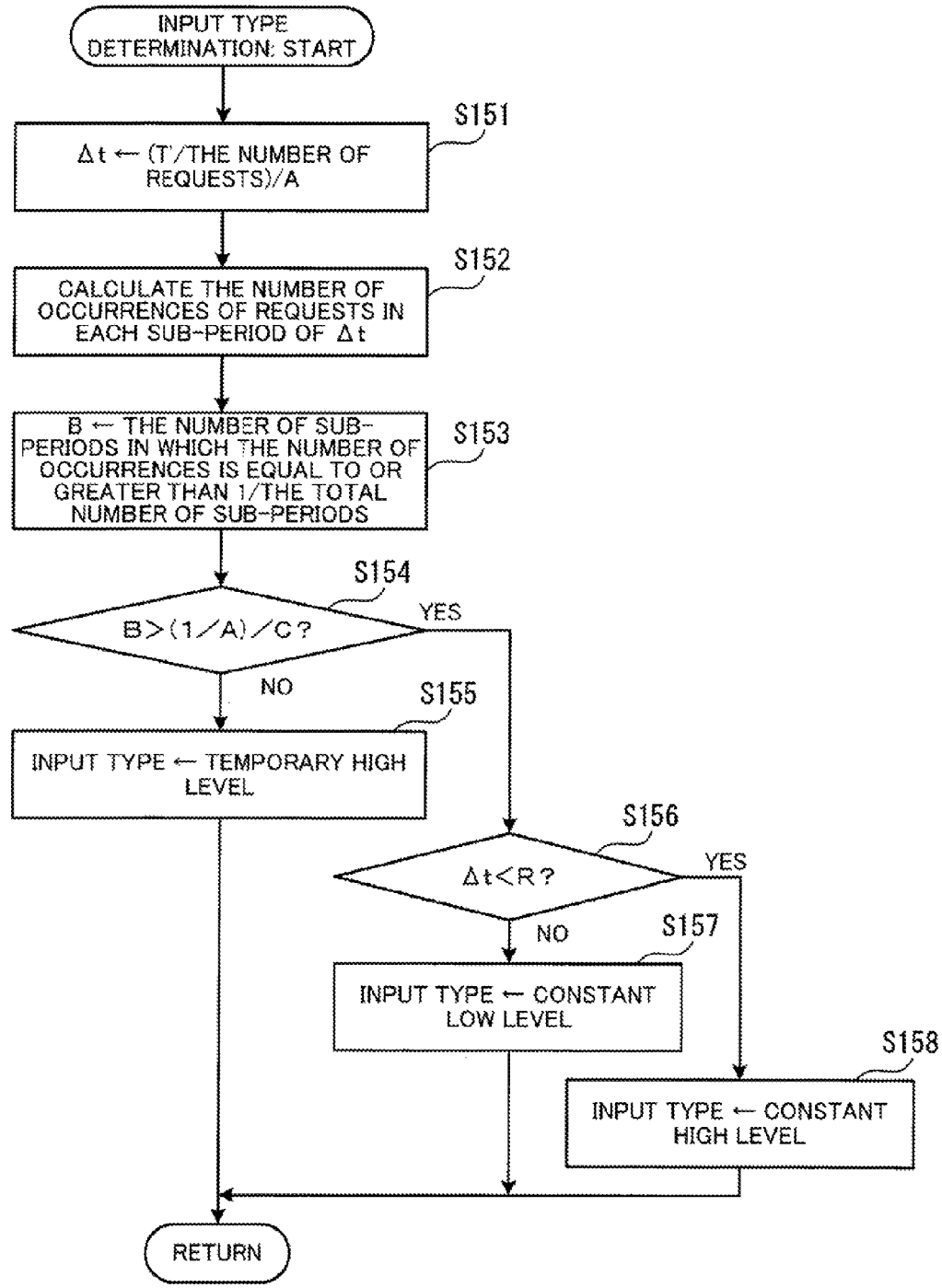
FIG. 15 is a flowchart illustrating an exemplary procedure of input type determination processing.

FIG. 15 is a flowchart illustrating an exemplary procedure of input type determination processing. In the following, the processing of FIG. 15 is described in order of step number.

(Step S151) The analysis unit 170 divides T' by the number of request messages in the interval of the identification number T and the dilution parameter A so as to obtain a division result Δt. It is to be noted that the number of request messages is the number of message pairs whose request detection times are in the interval of the identification number T among the message pairs extracted as to-be-analyzed message pairs in Step S115. The division result Δt is expressed by $\Delta t = (T'/N)/A$, wherein N is the number of request messages and is an integer equal to or greater than 1. Since the dilution parameter A is a constant, the value of Δt depends on the number of request messages in the interval of the identification number T. As the number of request messages increases, Δt decreases.

There may be a case where the number of request messages in the interval of the identification number T is 0. In this case, $\Delta t = (T'/N)/A$ is not applicable to calculation of Δt. In the case where the number of request messages is 0, the analysis unit 170 selects the constant low level as the input type without performing Steps S151 through S158, and stores the constant low level as the input type in the responsiveness degradation cause table 181, for example.

(Step S152) The analysis unit 170 divides the reduced analysis period into sub-periods of time Δt, and calculates the number of occurrences of request messages in each of the sub-periods. It is to be noted that the number of occurrences of request messages in a sub-period is the number of message pairs whose request detection time are in the sub-period among the message pairs extracted as to-be-analyzed message pairs in Step S115. The expected value of the number of occurrences is 1/A.

(Step S153) The analysis unit 170 calculates the proportion of the number of sub-periods in which the number of occurrences of request messages is equal to or greater than 1 to the total number of sub-periods. For example, the analysis unit 170 divides the number of sub-periods in which the number of occurrences of request messages is equal to or greater than 1 by the total number of sub-periods. The analysis unit 170 sets the division result as an occurrence rate B. In the case where the request messages in the period of the identification number T are dispersed in different sub-periods from each other, the value of the occurrence rate B is 1/A. On the other hand, in the case where the request messages in the period of the identification number T are all concentrated in the same sub-period, the value of the occurrence rate B is 1/(N×A). That is, the less the number of sub-periods in which a request message is present is, the less the value of the appearance rate B is.

(Step S154) The analysis unit 170 determines whether the value of the occurrence rate B calculated in Step S153 is greater than a value (1/A)/C, which is a value obtained by dividing 1 by the dilution parameter A and the frequency margin parameter C. If the analysis unit 170 determines that the value of the occurrence rate B is greater than (1/A)/C, the process proceeds to Step S156. On the hand, if the analysis unit 170 determines that the occurrence rate B is less than or equal to (1/A)/C, the process proceeds to Step S155.

(Step S155) Since the degree of concentration of request messages is high, the analysis unit 170 determines that the input type is the temporary high level, and stores the temporary high level as the input type in the responsiveness degradation cause table 181. Then, the input type determination processing ends.

(Step S156) Since the degree of concentration of request messages is not high, the analysis unit 170 determines that the input type is either the constant low level or the constant high level. Then, the analysis unit 170 determines whether $\Delta t$ is less than an average response time R of the message pairs whose response times are less than the response threshold THR ($\Delta t < R$). If the analysis unit 170 determines that $\Delta t$ is less than R, the process proceeds to Step S158. On the other hand, if the analysis unit 170 determines that $\Delta t$ is equal to or greater than R, the process proceeds to Step S157.

It is to be noted that since $\Delta t = (T'/N)/A$, the expression $\Delta t < R$ is transformed into $(T'/A)/R < N$. That is, this is a determination of whether the number of request messages N in the message pairs whose response times are greater than the response threshold THR is greater than a predetermined value $(T'/A)/R$.

(Step S157) If $\Delta t$ is equal to or greater than R, the number of messages N is not so great. In this case, the analysis unit 170 determines that the input type is the constant low level, and stores the constant low level as the input type in the responsiveness degradation cause table 181. Then, the input type determination processing ends.

(Step S158) If $\Delta t$ is less than R, the number of messages N is great. In this case, the analysis unit 170 determines that the input type is the constant high level, and stores the constant high level as the input type in the responsiveness degradation cause table 181. Then, the input type determination processing ends.

In this manner, the input type is selected and stored in the responsiveness degradation cause table 181.

Next, the output type determination processing will be described in detail.

Figure 16:
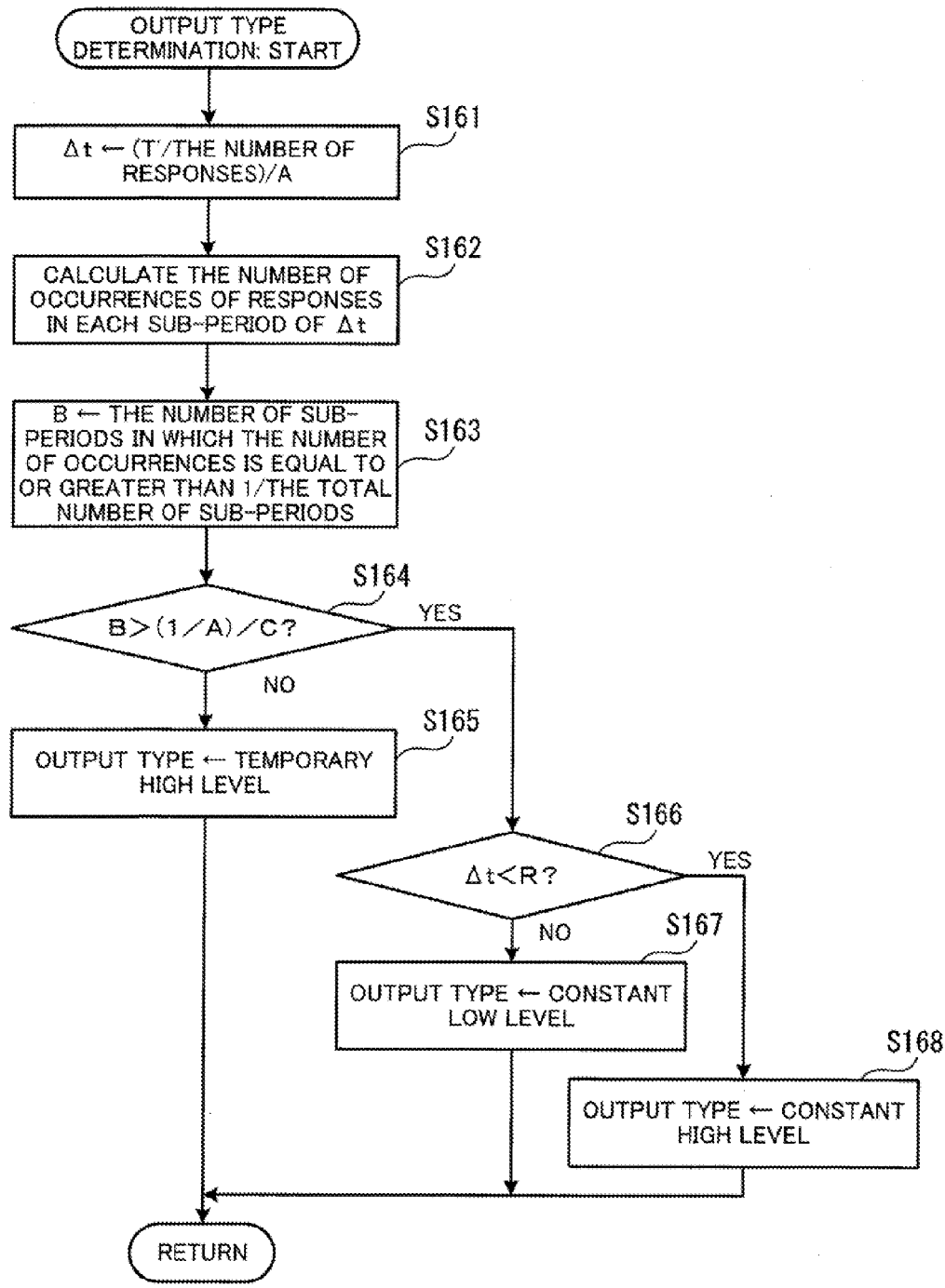
FIG. 16 is a flowchart illustrating an exemplary procedure of output type determination processing.

FIG. 16 is a flowchart illustrating an exemplary procedure of output type determination processing. In the following, the processing of FIG. 16 is described in order of step number.

(Step S161) The analysis unit 170 divides T' by the number of response messages in the interval of the identification number T and the dilution parameter A so as to obtain a division result $\Delta t$. It is to be noted that the number of response messages is the number of message pairs whose response detection times are in the interval of the identification number T among the message pairs extracted as to-be-analyzed message pairs in Step S115. The division result $\Delta t$ is expressed by $\Delta t = (T'/M)/A$, wherein M is the number of response messages and is an integer equal to or greater than 1. Since the dilution parameter A is a constant, the value of $\Delta t$ depends on the number of response messages in the interval of the identification number T. As the number of response messages increases, $\Delta t$ decreases.

There may be a case where the number of response messages in the interval of the identification number T is 0. In this case, $\Delta t = (T'/M)/A$ is not applicable to calculation of $\Delta t$. In the case where the number of response messages is 0, the analysis unit 170 selects the constant low level as the output type without performing Steps S161 through S168, and stores the constant low level as the output type in the responsiveness degradation cause table 181, for example.

(Step S162) The analysis unit 170 divides the reduced analysis period into sub-periods of time $\Delta t$, and calculates the number of occurrences of response messages in each of the sub-periods. It is to be noted that the number of occurrences of response messages in a sub-period is the number of message pairs whose response detection times are in the sub-period among the message pairs extracted as to-be-analyzed message pairs in Step S115. The expected value of the number of occurrences is 1/A.

(Step S163) The analysis unit 170 calculates the proportion of the number of sub-periods in which the number of occurrences of response messages is equal to or greater than 1 to the total number of sub-periods. For example, the analysis unit 170 divides the number of sub-periods in which the number of occurrences of response messages is equal to or greater than 1 by the total number of sub-periods. The analysis unit 170 sets the division result as an occurrence rate B. In the case where the response messages in the period of the identification number T are dispersed in different sub-periods from each other, the value of the occurrence rate B is 1/A. On the other hand, in the case where the response messages in the period of the identification number T are all concentrated in a common sub-period, the value of the occurrence rate B is 1/(M×A). That is, the less the number of sub-periods in which a response message is present is, the less the value of the appearance rate B is.

(Step S164) The analysis unit 170 determines whether the value of the occurrence rate B calculated in Step S163 is greater than a value (1/A)/C, which is a value obtained by dividing 1 by the dilution parameter A and the frequency margin parameter C. If the analysis unit 170 determines that the value of the occurrence rate B is greater than (1/A)/C, the process proceeds to Step S166. On the hand, if the analysis unit 170 determines that the occurrence rate B is less than or equal to (1/A)/C, the process proceeds to Step S165.

(Step S165) Since the degree of concentration of response messages is high, the analysis unit 170 determines that the output type is the temporary high level, and stores the temporary high level as the output type in the responsiveness degradation cause table 181. Then, the output type determination processing ends.

(Step S166) Since the degree of concentration of response messages is not high, the analysis unit 170 determines that the output type is either the constant low level or the constant high level. Then, the analysis unit 170 determines whether $\Delta t$ is less than an average response time R of the message pairs whose response times are less than the response threshold THR. If the analysis unit 170 determines that $\Delta t$ is less than R, the process proceeds to Step S168. On the other hand, if the analysis unit 170 determines that $\Delta t$ is equal to or greater than R, the process proceeds to Step S167.

It is to be noted that since $\Delta t=(T'/M)/A$, the expression $\Delta t<R$ is transformed into $(T'/A)/R<M$. That is, this is a determination of whether the number of response messages M in the message pairs whose response times are greater than the response threshold THR is greater than a predetermined value $(T'/A)/R$.

(Step S167) If $\Delta t$ is equal to or greater than R, the number of messages M is not so great. In this case, the analysis unit 170 determines that the output type is the constant low level, and stores the constant low level as the output type in the responsiveness degradation cause table 181. Then, the output type determination processing ends.

(Step S168) If $\Delta t$ is less than R, the number of messages M is great. In this case, the analysis unit 170 determines that the output type is the constant high level, and stores the constant high level as the output type in the responsiveness degradation cause table 181. Then, the output type determination processing ends.

In this manner, the output type is selected and stored in the responsiveness degradation cause table 181.

Next, the responsiveness degradation cause output processing will be described in detail.

Figure 17:
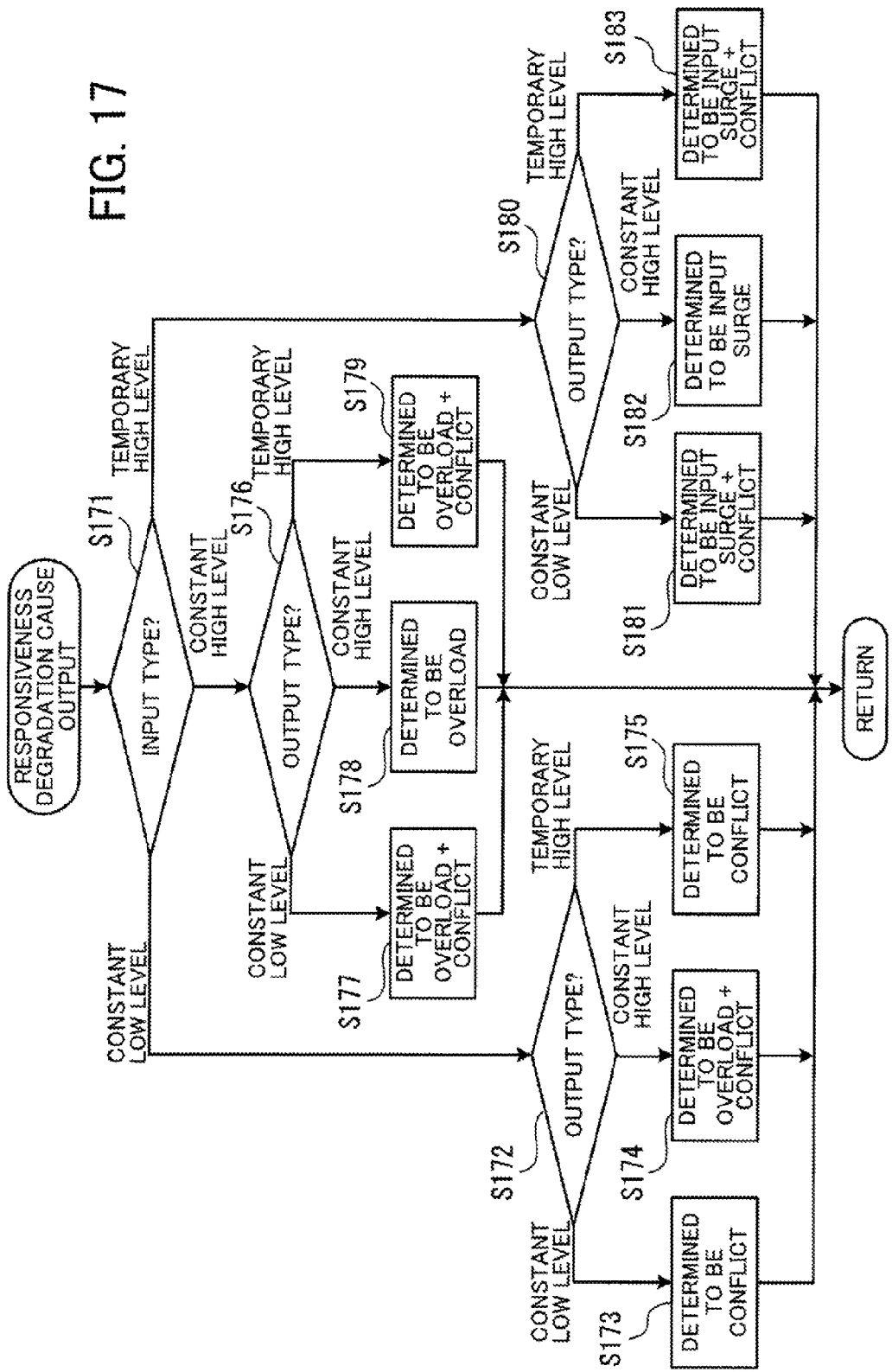
FIG. 17 is a flowchart illustrating the procedure of responsiveness degradation cause output processing.

FIG. 17 is a flowchart illustrating the procedure of responsiveness degradation cause output processing. In the following, the processing of FIG. 17 is described in order of step number.

(Step S171) The analysis unit 170 determines the input type of the interval of the identification number T by referring to the responsiveness degradation cause table 181. If the analysis unit 170 determines that the input type is the constant low level, the process proceeds to Step S172. If the analysis unit 170 determines that the input type is the constant high level, the process proceeds to Step S172. If the analysis unit 170 determines that the input type is the temporary high level, the process proceeds to Step S180.

(Step S172) The analysis unit 170 determines the output type of the interval of the identification number T by referring to the responsiveness degradation cause table 181. If the analysis unit 170 determines that the output type is the constant low level, the process proceeds to Step S173. If the analysis unit 170 determines that the output type is the constant high level, the process proceeds to Step S174. If the analysis unit 170 determines that the output type is the temporary high level, the process proceeds to Step S175.

(Step S173) In the case where the input type is the constant low level and the output type is the constant low level, the analysis unit 170 determines that the cause of the responsiveness degradation is "conflict", and stores the determination result in the responsiveness degradation cause table 181. Then, the responsiveness degradation cause output processing ends.

(Step S174) In the case where the input type is the constant low level and the output type is the constant high level, the analysis unit 170 determines that the cause of the responsiveness degradation is "overload+conflict", and stores the determination result in the responsiveness degradation cause table 181. Then, the responsiveness degradation cause output processing ends.

(Step S175) In the case where the input type is the constant low level and the output type is the temporary high level, the analysis unit 170 determines that the cause of the responsiveness degradation is "conflict", and stores the determination result in the responsiveness degradation cause table 181. Then, the responsiveness degradation cause output processing ends.

(Step S176) The analysis unit 170 determines the output type of the interval of the identification number T by referring to the responsiveness degradation cause table 181. If the analysis unit 170 determines that the output type is the constant low level, the process proceeds to Step S177. If the analysis unit 170 determines that the output type is the constant high level, the process proceeds to Step S178. If the analysis unit 170 determines that the output type is the temporary high level, the process proceeds to Step S179.

(Step S177) In the case where the input type is the constant high level and the output type is the constant low level, the analysis unit 170 determines that the cause of the responsiveness degradation is "overload+conflict", and stores the determination result in the responsiveness degradation cause table 181. Then, the responsiveness degradation cause output processing ends.

(Step S178) In the case where the input type is the constant high level and the output type is the constant high level, the analysis unit 170 determines that the cause of the responsiveness degradation is "overload", and stores the determination result in the responsiveness degradation cause table 181. Then, the responsiveness degradation cause output processing ends.

(Step S179) In the case where the input type is the constant high level and the output type is the temporary high level, the analysis unit 170 determines that the cause of the responsiveness degradation is "overload+conflict", and stores the determination result in the responsiveness degradation cause table 181. Then, the responsiveness degradation cause output processing ends.

(Step S180) The analysis unit 170 determines the output type of the interval of the identification number T by referring to the responsiveness degradation cause table 181. If the analysis unit 170 determines that the output type is the constant low level, the process proceeds to Step S181. If the analysis unit 170 determines that the output type is the constant high level, the process proceeds to Step S182. If the analysis unit 170 determines that the output type is the temporary high level, the process proceeds to Step S183.

(Step S181) In the case where the input type is the temporary high level and the output type is the constant low level, the analysis unit 170 determines that the cause of the responsiveness degradation is "input surge+conflict", and stores the determination result in the responsiveness degradation cause table 181. Then, the responsiveness degradation cause output processing ends.

(Step S182) In the case where the input type is the temporary high level and the output type is the constant high level, the analysis unit 170 determines that the cause of the responsiveness degradation is "input surge", and stores the determination result in the responsiveness degradation cause table 181. Then, the responsiveness degradation cause output processing ends.

(Step S183) In the case where the input type is the temporary high level and the output type is the temporary high level, the analysis unit 170 determines that the cause of the responsiveness degradation is "input surge+conflict", and stores the determination result in the responsiveness degradation cause table 181. Then, the responsiveness degradation cause output processing ends.

In this manner, the cause of the responsiveness degradation is determined on the basis of the combination of the input type and the output type. The above determination results are summarized in FIG. 18.

FIG. 18 illustrates a determination pattern of the cause of the responsiveness degradation. In FIG. 18, the input levels are set as the item names of columns, and the output levels are set as the item names of rows. In each cell (i.e., intersection between a row and a column), the cause of the responsiveness degradation corresponding to the combination of the input level indicated as the item name of the column and the output level indicated as the item name of the row is stored.

For example, in the case of "input: constant low level" and "output: constant low level" (pattern 1), the cause of the responsiveness degradation is "conflict". In the case of "input: constant high level" and "output: constant low level" (pattern 2), the cause of the responsiveness degradation is "overload+conflict". In the case of "input: temporary high level" and "output: constant low level" (pattern 3), the cause of the responsiveness degradation is "input surge+conflict".

In the case of "input: constant low level" and "output: constant high level" (pattern 4), the cause of the responsiveness degradation is "overload+conflict". In the case of "input: constant high level" and "output: constant high level" (pattern 5), the cause of the responsiveness degradation is "overload". In the case of "input: temporary high level" and "output: constant high level" (pattern 6), the cause of the responsiveness degradation is "input surge".

Further, in the case of "input: constant low level" and "output: temporary high level" (pattern 7), the cause of the responsiveness degradation is "conflict". In the case of "input: constant high level" and "output: temporary high level" (pattern 8), the cause of the responsiveness degradation is "overload+conflict". In the case of "input: temporary high level" and "output: temporary high level" (pattern 9), the cause of the responsiveness degradation is "input surge+conflict".

In the following, variations in input frequency of request messages and output frequency of response messages of message pairs will be described for each cause of the responsiveness degradation with reference to FIGS. 19 through 23. In FIGS. 19 through 23, the horizontal axis represents time, and the vertical axis represents the frequencies of request messages and response messages (number per unit time). The frequencies of request messages and response messages are calculated on the basis of the number of request messages and response messages, respectively, contained in the message pairs whose response times are greater than the response threshold.

Figure 19:
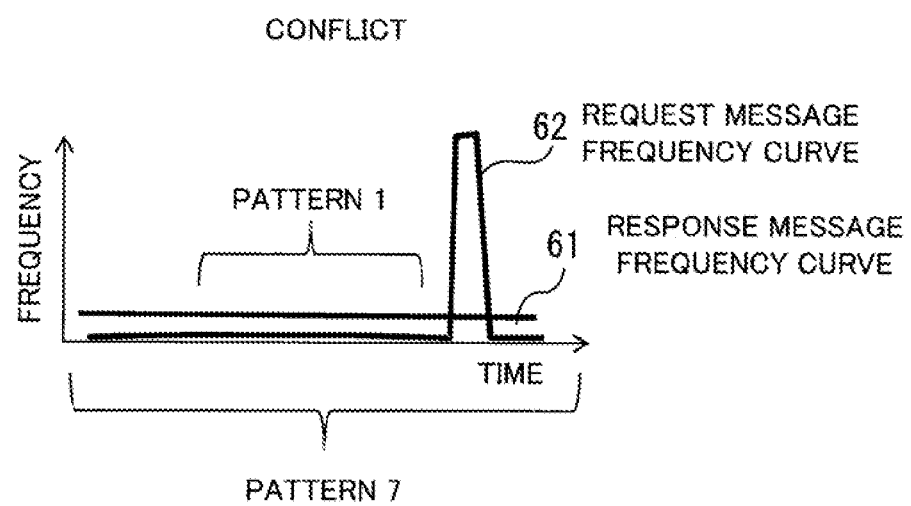
FIG. 19 illustrates an example of the request and response frequencies upon occurrence of a conflict.

FIG. 19 illustrates an example of the request and response frequencies upon occurrence of a conflict. In FIG. 19, a request message frequency curve 61 indicates the temporal change in the frequency of request messages upon occurrence of a conflict, and a response message frequency curve 62 indicates the frequency of response messages upon occurrence of a conflict.

If an operation (task, process, thread, or the like) exclusively uses hardware or software resources for a long period of time, other operations that need to use those resources are put on hold until those resources are released. When the resources having been exclusively used are released, the operations having been put on hold are executed all at once. In this case, the frequency of request messages is constant at a low level. On the other hand, the frequency of response messages is maintained at a very low level, then increases sharply, and then returns to a low level.

In the case where a conflict occurs as described above, the period before the sharp increase in the response message frequency is detected as pattern 1 of FIG. 18. Further, this period and the subsequent period in which the response message frequency sharply increases are detected together as pattern 7 of FIG. 18.

Figure 20:
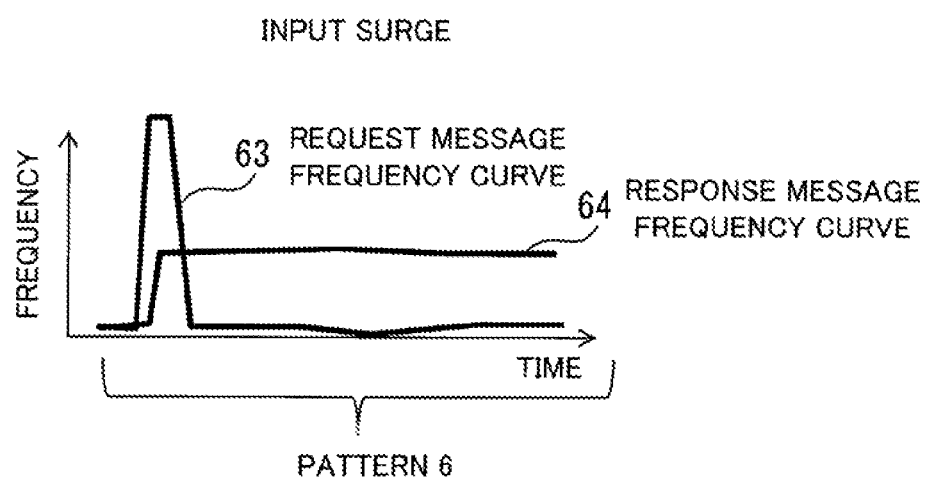
FIG. 20 illustrates an example of the request and response frequencies upon occurrence of an input surge.

FIG. 20 illustrates an example of the request and response frequencies upon occurrence of an input surge. In FIG. 20, a request message frequency curve 63 upon occurrence of an input surge, and a response message frequency curve 64 upon occurrence of an input surge.

In the case where an input surge occurs, the number of request messages sharply increases in a certain period of time, so that the frequency of request messages temporarily increases. After that, the frequency of request messages remains at a low level. On the other hand, the frequency of response messages is low before the sharp increase in the number of request messages, and remains at a high level after the sharp increase in the number of request messages.

A series of states upon occurrence of such an input surge is detected as pattern 6 of FIG. 18.

Figure 21:
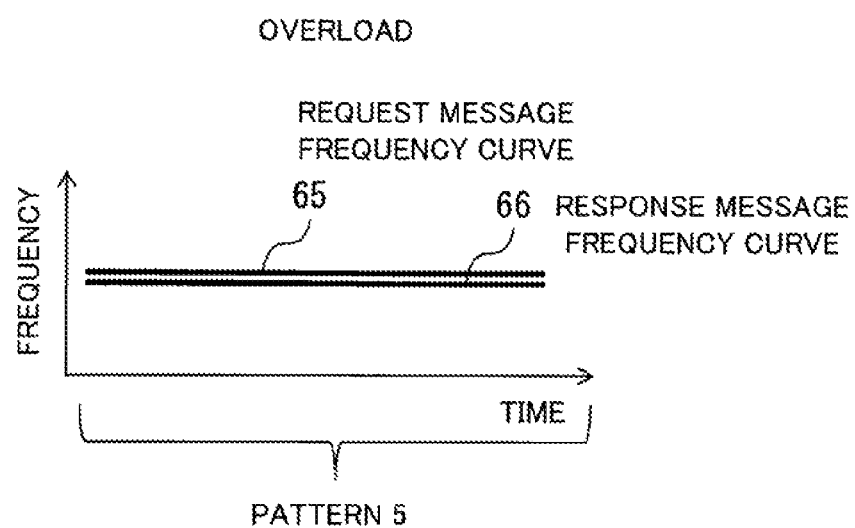
FIG. 21 illustrates an example of the request and response frequencies upon occurrence of an overload.

FIG. 21 illustrates an example of the request and response frequencies upon occurrence of an overload. In FIG. 21, a request message frequency curve 65 upon occurrence of an overload, and a response message frequency curve 66 upon occurrence of an overload.

In the case where an overload occurs, both the frequency of request messages and the frequency of response messages remain at a high level. A series of states upon occurrence of such an overload is detected as pattern 5 of FIG. 18.

Figure 22:
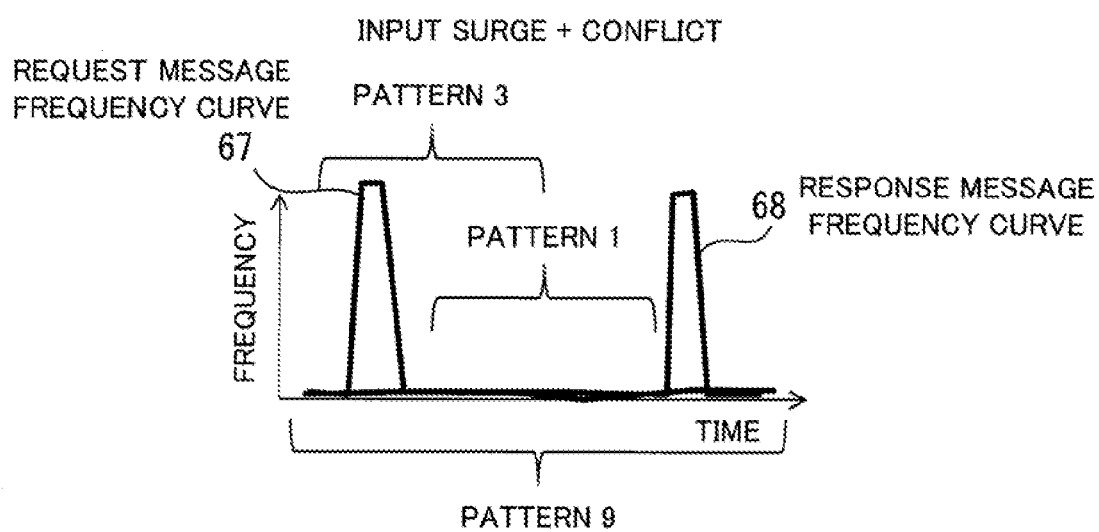
FIG. 22 illustrates an example of the request and response frequencies upon occurrence of both an input surge and a conflict.

FIG. 22 illustrates an example of the request and response frequencies upon occurrence of both an input surge and a conflict. In FIG. 22, a request message frequency curve 67 upon occurrence of an input surge and a conflict, and a response message frequency curve 68 upon occurrence of an input surge and a conflict.

In the case where both an input surge and a conflict occur, the number of request messages sharply increases in a certain period of time, so that the frequency of request messages temporarily increases. After that, the frequency of request messages remains at a low level. On the other hand, the frequency of response messages is maintained at a very low level, then increases sharply, and then returns to a low level.

In the case where both an input surge and a conflict occur as described above, the period before the increase in the response message frequency is detected as pattern 3 of FIG. 18. Further, the period after the change in the request message frequency from the high level to the low level, but before the increase in the response message frequency is detected as pattern 1 of FIG. 18. Further, a series of states upon occurrence of both an input surge and a conflict is detected as pattern 9 of FIG. 18.

Figure 23:
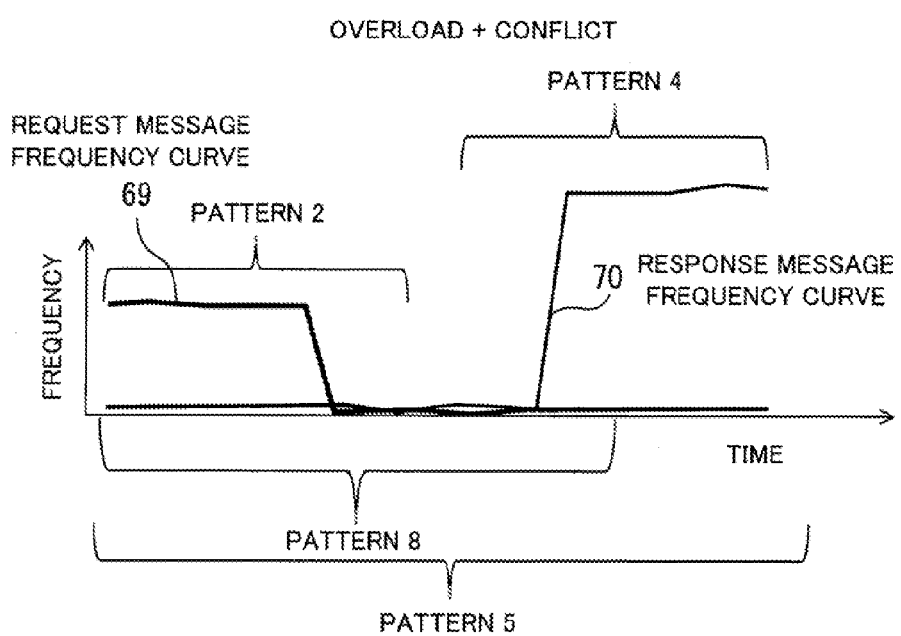
FIG. 23 illustrates an example of the request and response frequencies upon occurrence of both an overload and a conflict.

FIG. 23 illustrates an example of the request and response frequencies upon occurrence of both an overload and a conflict. In FIG. 23, a request message frequency curve 69 upon occurrence of both an overload and a conflict, and a response message frequency curve 70 upon occurrence of both an overload and a conflict.

In the case where both an overload and a conflict occur, the frequency of request messages is maintained at a high level, then decreases to a low level at a certain point in time, and then remains at a low level. On the other hand, the frequency of response messages is maintained at a low level, then increases to a high level at a certain point in time, and then remains at a high level.

In the case where both an overload and a conflict occur as described above, the period in which the frequency of request messages decreases from a high level to a low level before the increase in the response message frequency to a high level is detected as pattern 2 of FIG. 18. Further, the period after the decrease in the frequency of request messages to a low level, in which the frequency of response messages increases to a high level and remains at a high level, is detected as pattern 4 of FIG. 18. The period in which the frequency of request messages decreases from a high level to a low level and then the frequency of response messages increases to a high level is detected as pattern 8 of FIG. 18. Further, a series of states upon occurrence of both an overload and a conflict is detected as pattern 5 of FIG. 18.

In this way, it is possible to detect any of a conflict, an input surge, an overload, and a combination of two or more of these causes.

Figure 24:
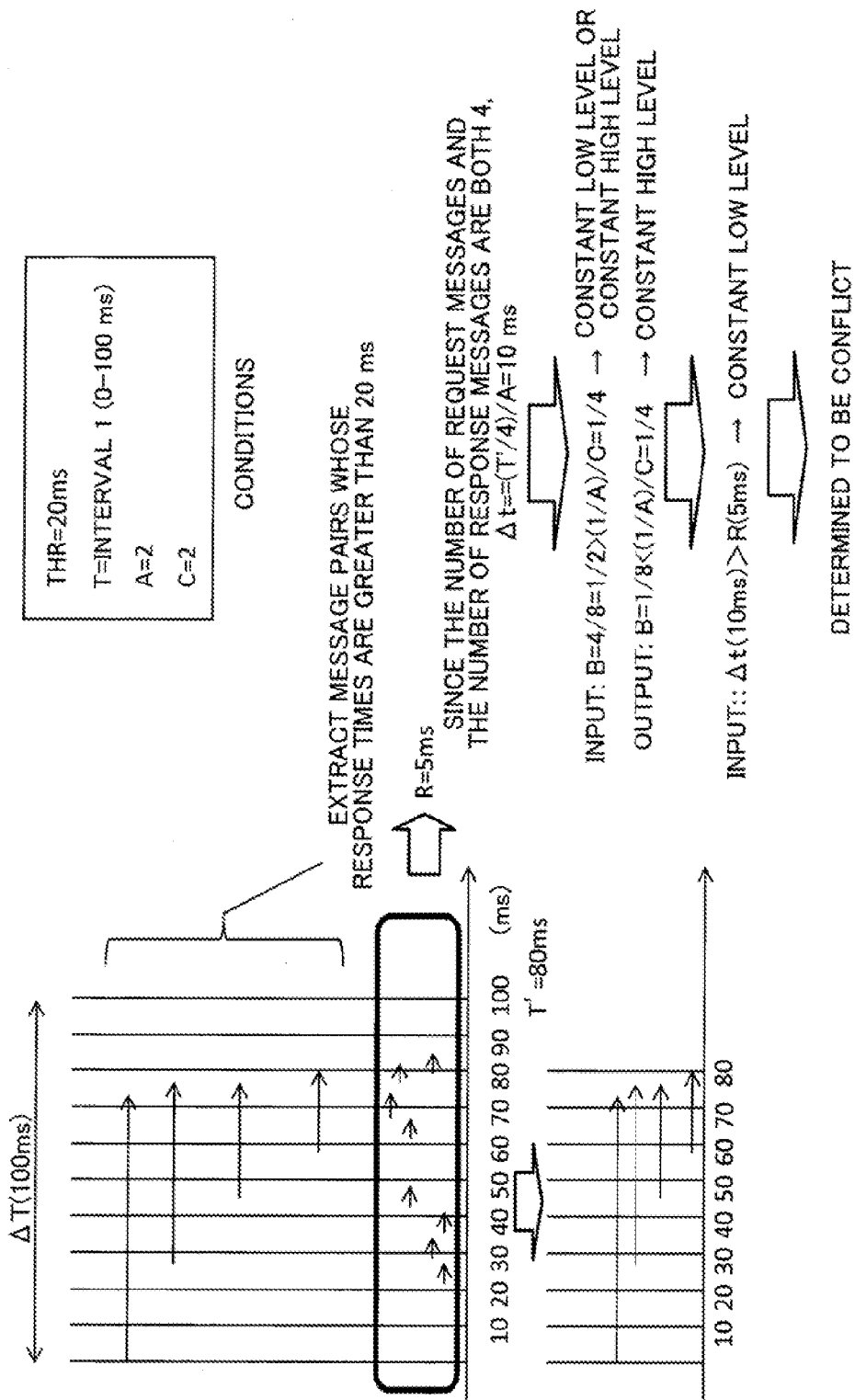
FIG. 24 is a flowchart illustrating an example of determining the cause of the responsiveness degradation.

FIG. 24 is a flowchart illustrating an example of determining the cause of the responsiveness degradation. In the example of FIG. 24, it is assumed that $\Delta T$ is 100 ms; the dilution parameter A is 2; and the frequency margin parameter C is 2. In this example, the cause of the responsiveness degradation of a first interval (0 through 100 ms), which is obtained by dividing the observation period by 100 ms, is analyzed.

First, an average R of response times of message pairs in the entire observation period whose response times are less than or equal to a response threshold THR (20 ms) is calculated. In the example of FIG. 24, R=5 ms.

Then, from the interval to be analyzed, message pairs whose response times are greater than 20 ms are extracted. In the example of FIG. 24, four message pairs are extracted.

Then, a period in which operations corresponding to the extracted message pairs are not performed is excluded from the period to be analyzed so as to reduce the analysis period. In the example of FIG. 24, in the period of 80 ms through 100 ms, none of the operations corresponding to the extracted message pairs is performed. Therefore, the period to be analyzed is reduced to the period from 0 ms to 80 ms, so that T'=80 ms.

Then, in the case of determining the input type, $\Delta T$ is calculated on the basis of the number of request messages. On the other hand, in the case of determining the output type, $\Delta T$ is calculated on the basis of the number of response messages. In the example of FIG. 24, the number of request messages and the number of response messages that are present in the interval T are both 4. Accordingly, in both the case of determining the input type and the case of determining the output type, $\Delta t$=(T'/the number of messages)/dilution parameter A=(80/4)/2=10 ms.

Thus, the interval of T' is divided into sub-intervals of 10 ms. As a result, eight sub-intervals are generated, which are intervals from 0 ms to 10 ms, from 10 ms to 20 ms, from 20 ms to 30 ms, from 30 ms to 40 ms, from 40 ms to 50 ms, from 50 ms to 60 ms, from 60 ms to 70 ms, and from 70 ms to 80 ms.

Then, in the case of determining the input type, the number of sub-intervals in which the number of occurrences of request messages is equal to or greater than 1 is divided by the total number of sub-intervals, and the obtained value is set as the occurrence rate B. In the example of FIG. 24, the detection times of the request messages of the four messages are in four different sub-intervals. Accordingly, there are four sub-intervals in which the number of occurrences of request messages is equal to or greater than 1. Hence, the occurrence rate B=4/8=½. Then, the occurrence rate B is compared to (½)/2=¼, which is the value obtained by dividing 1 by the dilution parameter A and the margin parameter C. Then, B(½)>¼. This indicates that the request messages are not concentrated and therefore the input type is not the temporary high level. That is, the input type is the constant low level or the constant high level.

On the other hand, in the case of determining the output type, the number of sub-intervals in which the number of occurrences of response messages is equal to or greater than 1 is divided by the total number of sub-intervals, and the obtained value is set as the occurrence rate B. In the example of FIG. 24, the detection times of the response messages of the four message pairs are all in the same sub-interval. Accordingly, there is only one sub-interval in which the number of occurrences of response messages is equal to or greater than 1. Hence, the occurrence rate B=⅛. Then, the occurrence rate B is compared to (½)/2=¼, which is the value obtained by dividing 1 by the dilution parameter A and the margin parameter C. Then, B(⅛)<¼. In this case, the response messages are concentrated, and therefore the output type is determined to be the temporary high level.

In the case of determining the input type, a comparison of $\Delta T$ to R is further performed. In the example of FIG. 24, $\Delta T$(10 ms)>R(5 ms). In this case, the input type is determined to be the constant low level.

With these operations, it is determined that the input type is the constant low level and the output type is the temporary high level. The cause of the responsiveness degradation corresponding to this combination of the input type and the output type is "conflict". Accordingly, the cause of the responsiveness degradation in the analyzed interval T is determined to be "conflict".

The analysis results indicating the cause of the responsiveness degradation of each of the intervals of the length $\Delta T$ are stored in the responsiveness degradation cause table 181 of the analysis result storage unit 180. Then, the display unit 190 displays the analysis results on the monitor 11, for example.

Figure 25:
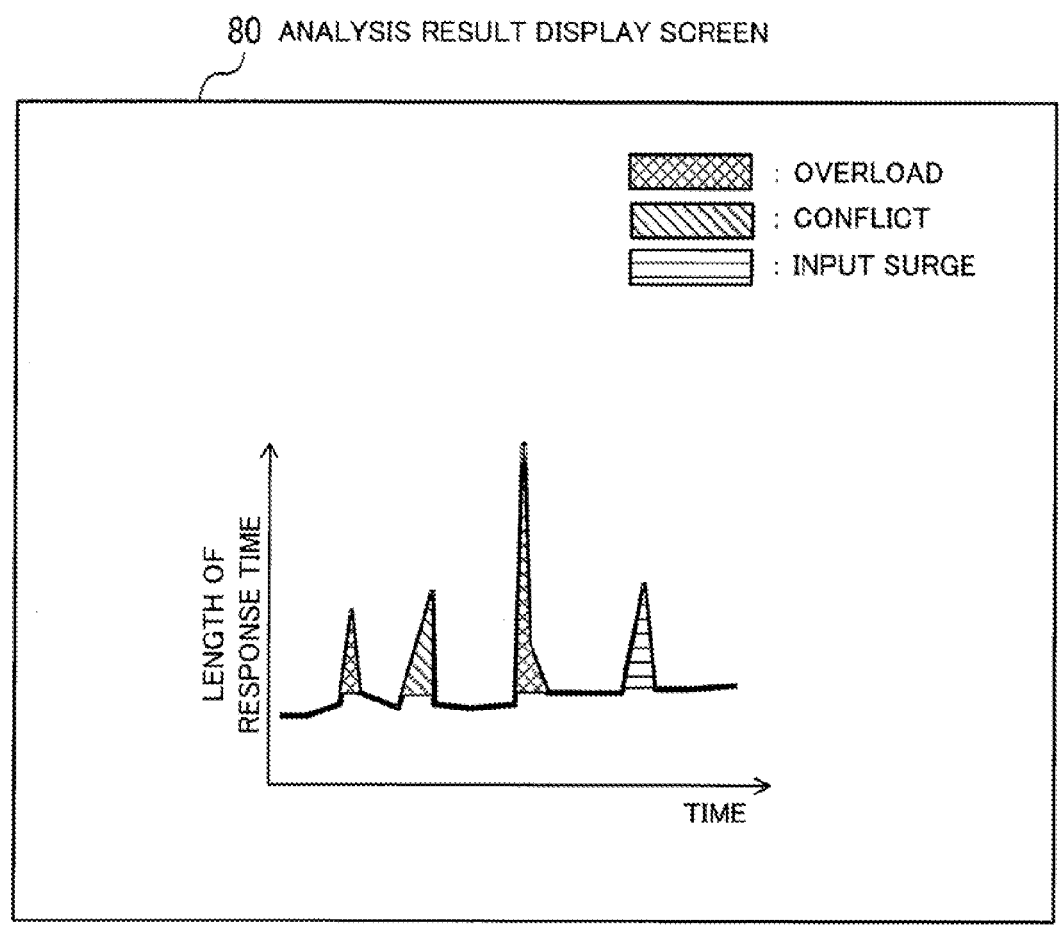
FIG. 25 illustrates an example of an analysis result display screen.

FIG. 25 illustrates an example of an analysis result display screen. An analysis result display screen displays a graph in which the horizontal axis represents time and the vertical axis represents the length of the response time. In the graph, points representing the longest response times of message pairs whose request message or response message is received in a unit time are connected by a line. The graph is displayed in a manner such that the types of causes of responsiveness degradation in the portions where the response time is excessively great are visually distinguishable. In the example of FIG. 25, different types of causes of the responsiveness degradation are indicated by different types of hatching. Alternatively, different types of causes of the responsiveness degradation may be indicated by different colors.

In the example of FIG. 25, there are four responsiveness degraded periods in the observation period. The cause of the responsiveness degradation in the first responsiveness degraded period is an overload. The cause of the responsiveness degradation in the second responsiveness degraded period is a conflict. The cause of the responsiveness degradation in the third responsiveness degraded period is an overload. The cause of the responsiveness degradation in the fourth responsiveness degraded period is an input surge.

When the user sees this analysis result display screen 80, the user easily recognizes occurrences of responsiveness degradation and their causes. For analyzing the cause of the responsiveness degradation in more detail, for example, the user selects a time slot on the analysis result display screen 80, and extracts information about the message pairs that are present in the selected time slot. Then, the user displays the contents of the extracted message pairs on the screen so as to perform detailed analysis (drill-down analysis) of the cause of the responsiveness degradation.

It is to be noted that the display unit 190 may display a scatter diagram, with the horizontal axis representing time and the vertical axis representing the length of the response time, in which points corresponding to message pairs are plotted.

The display unit 190 may automatically change the display mode of the interactive data analysis using a scatter diagram. The term "interactive data analysis using a scatter diagram" as used herein refers to an analysis method that involves specifying a range of data to be analyzed in a scatter diagram using a mouse or the like. In this case, it is convenient if points representing message pairs to be analyzed among points on the graph are enclosed in a rectangle. Points representing the message pairs may be plotted on a scatter diagram either by plotting detection times of request messages or by plotting detection times of response messages. Which of these methods is suitable depends on the type of the causes of responsive degradation. In the second embodiment, a plotting method is automatically selected as described below so as to make it easy to specify a range using a rectangle.

Figure 26:
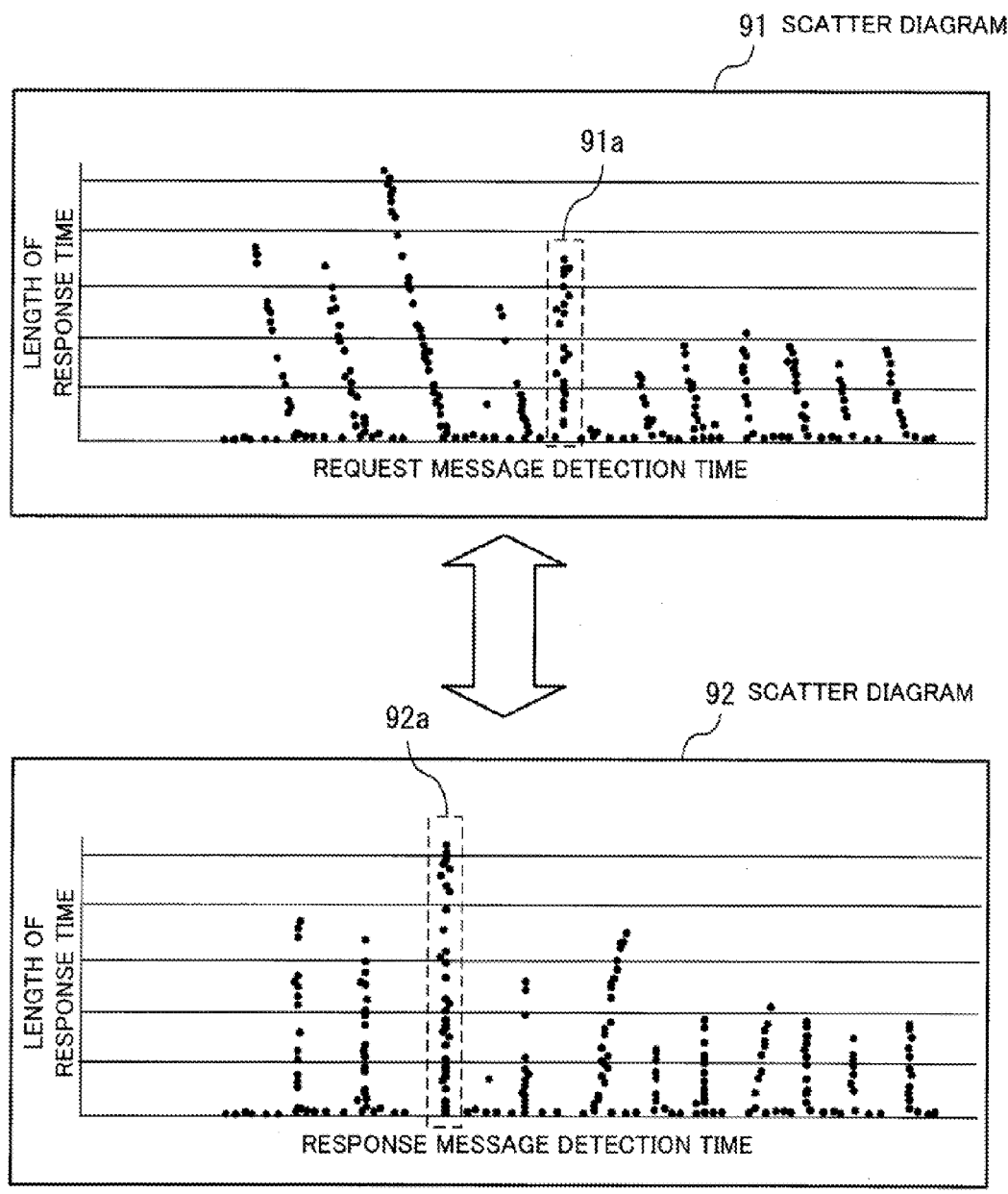
FIG. 26 illustrates an example of switching between scatter diagrams to be displayed.

FIG. 26 illustrates an example of switching between scatter diagrams to be displayed. In the upper part of FIG. 26 is illustrated a scatter diagram 91 in which the position of each of the points representing message pairs is determined on the basis of the request message detection time. In the lower part of FIG. 26 is illustrated a scatter diagram 92 in which the position of each of the points representing message pairs is determined on the basis of the response message detection time. The display unit 190 switches the display between the two types of scatter diagrams 91 and 92 in response to a user input that specifies a display method. Thus, an appropriate scatter diagram is displayed in accordance with the cause of the responsiveness degradation so that the user may enclose message pairs to be subjected to detailed analysis. Further, the display unit 190 displays information about the message pairs corresponding to the points enclosed in the rectangle in response to a user input, for example. Thus, the user may perform more detailed analysis using a drill-down approach or the like on the basis of the displayed information.

For example, in the case where the cause of the responsiveness degradation is an input surge, request messages are concentrated in a short period of time. Upon enclosing a collection of points corresponding to the request messages that are concentrated in a short period of time by a rectangle 91a and analyzing the contents of the message pairs represented by the points that are enclosed in the rectangle 91a, the collection of these points is more easily enclosed in the rectangle 91a in the scatter diagram 91 in which points representing the request message detection times are plotted.

On the other hand, in the case where the cause of the responsiveness degradation is a conflict, when an operation having been exclusively using the resources releases the resources, a large number of operations having been put on hold are processed, so that a large number of response messages are output in a short period of time. Upon enclosing a collection of points corresponding to the response messages that are concentrated in a short period of time by a rectangle 92a and analyzing the contents of the message pairs represented by the points that are enclosed in the rectangle 92a, the collection of these points is more easily enclosed in the rectangle 92a in the scatter diagram 92 in which points representing the response message detection times are plotted.

As described above, it is possible to determine whether there is a responsiveness degradation and to determine, in the case where there is a responsiveness degradation, the cause of the responsiveness degradation, on the basis of the detection times of request messages and response messages corresponding to the operations executed by a server. This allows the user to quickly and appropriately address the responsiveness degradation. For instance, if there is a period in which an overload is present, the resources of the server to be analyzed may be increased so as to prevent an overload thereafter. If there is a period in which a conflict is present, the configuration of the server to be analyzed may be changed so as to prevent conflict over the resources. If there is a period in which an input surge is present, the configurations of the other servers that transmit request messages to the server to be analyzed may be changed so as to prevent a large number of request messages from being transmitted at the same time.

Further, in the second embodiment, analysis is performed after narrowing the scope of analysis to the message pairs whose response times are greater than the threshold. Therefore, it is possible to detect performance degradation which occurred alone and analyzes its cause.

(C) Other Embodiments

For causing a computer, such as the analysis server 100, to execute the processing functions described in the above embodiments, a program is provided that includes instructions describing the functions of the information processing apparatus 1 or the analysis server 100. A computer executes the program so as to provide the processing functions described above. The program may be stored in a computer-readable recording medium. Examples of computer-readable recording media include magnetic storage devices, optical discs, magneto-optical storage media, and semiconductor memory devices. Examples of magnetic storage devices include hard disk drives (HDDs), flexible disks (FDs), and magnetic tapes. Examples of optical disc media include DVDs, DVD-RAMs, CD-ROMs, and CD-RWs. Examples of magneto-optical storage media include magneto-optical disks (MOs). It is to be noted that the computer-readable recording medium storing the program does not include transitory propagating signals per se.

The program may be distributed on portable storage media such as DVD and CD-ROM. Network-based distribution of the program may also be possible. In this case, the program may be stored in a storage device of a server computer so as to be downloaded from the server computer to other computers via a network.

For executing the program, a computer stores the program, which may be recorded on a portable storage medium or downloaded from a server computer, in its local storage unit. Then, the computer reads the program from its storage unit, thereby performing operations in accordance with the program. Alternatively, the computer may read the program directly from a portable storage medium so as to perform operation in accordance with the program. Alternatively, the computer may sequentially perform processing in accordance with the program every time the program is downloaded from the server computer.

The processing functions described above may also be implemented wholly or partly by using electronic circuits such as digital signal processor (DSP), application-specific integrated circuit (ASIC), and programmable logic device (PLD).

According to an embodiment, the cause of increase in response times may be determined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program, the computer program causing an information processing apparatus to perform a procedure comprising:

extracting from a storage unit, the storage unit storing a plurality of processing period records each including a request input time when an operation request is input to a device under analysis and a response output time when a response resulting from an operation performed in response to the operation request is output from the device under analysis, one or more of the plurality of processing period records corresponding to operations whose response times from the respective request input times to the respective response output times are greater than a threshold;

first analyzing, on the basis of the request input times included in the extracted processing period records, variations in input frequency of the operation requests corresponding to the operations whose response times are greater than the threshold;

second analyzing, on the basis of the response output times included in the extracted processing period records, variations in output frequency of the responses corresponding to the operations whose response times are greater than the threshold; and determining a cause of occurrence of the operations whose response times are greater than the threshold, on the basis of the variations in input frequency of the operation requests and the variations in output frequency of the responses.

2. The non-transitory computer-readable storage medium according to claim 1, wherein:

the first analyzing selects, as an input type, one of a temporary high level, a constant high level, and a constant low level, on the basis of the variations in input frequency of the operation requests, the temporary high level indicating that the input frequency of operation requests is temporarily at a high level, the constant high level indicating that the input frequency of operation requests is continuously at a high level, the constant low level indicating that the input frequency of operation requests is continuously at a low level;

the second analyzing selects, as an output type, one of a temporary high level, a constant high level, and a constant low level, on the basis of the variations in output frequency of the responses, the temporary high level indicating that the output frequency of responses is temporarily at a high level, the constant high level indicating that the output frequency of responses is continuously at a high level, the constant low level indicating that the output frequency of responses is continuously at a low level; and the determining determines the cause of occurrence of the operations whose response times are greater than the threshold, on the basis of a combination of the input type and the output type.

3. The non-transitory computer-readable storage medium according to claim 2, wherein:

the first analyzing divides an analysis period to be analyzed into sub-periods, the number of sub-periods being equal to or greater than the number of operation requests that are input in the analysis period, determines for each of the sub-periods whether at least one operation request is input, and selects the temporary high level as the input type when a proportion of the sub-periods in which at least one operation request is input is less than or equal to a predetermined value; and the second analyzing divides an analysis period to be analyzed into sub-periods, the number of sub-periods being equal to or greater than the number of responses that are output in the analysis period, determines for each of the sub-periods whether at least one response is output, and selects the temporary high level as the output type when a proportion of the sub-periods in which at least one response is output is less than or equal to a predetermined value.

4. The non-transitory computer-readable storage medium according to claim 2, wherein:

the first analyzing divides an analysis period to be analyzed into sub-periods, the number of sub-periods being equal to or greater than the number of operation requests that are input in the analysis period, selects the constant low level as the input type when a length of the sub-period is equal to or greater than an average response time of operations corresponding to the operation requests that are input in the analysis period, and selects the constant high level as the input type when the length of the sub-period is less than the average response time; and the second analyzing divides an analysis period to be analyzed into sub-periods, the number of sub-periods being equal to or greater than the number of responses that are output in the analysis period, selects the constant low level as the output type when a length of the sub-period is equal to or greater than an average response time of operations corresponding to the responses that are output in the analysis period, and selects the constant high level as the output type when the length of the sub-period is less than the average response time.

5. The non-transitory computer-readable storage medium according to claim 3, wherein each of the first analyzing and the second analyzing excludes, from the analysis period, a period in which an operation whose response time is greater than the threshold is not performed.

6. The non-transitory computer-readable storage medium according to claim 2, wherein the determining determines, when the input type is the constant high level and the output type is the constant high level, that the cause of occurrence of the operations whose response times are greater than the threshold is an overload.

7. The non-transitory computer-readable storage medium according to claim 2, wherein the determining determines, when the input type is the temporary high level and the output type is the constant high level, that the cause of occurrence of the operations whose response times are greater than the threshold is a burst of operation requests.

8. The non-transitory computer-readable storage medium according to claim 2, wherein the determining determines, when the input type is the constant low level and the output type is the temporary high level, that the cause of occurrence of the operations whose response times are greater than the threshold is a conflict over resources to be used for the operations.

9. The non-transitory computer-readable storage medium according to claim 2, wherein the determining determines, when the input type is the temporary high level and the output type is the temporary high level, that the cause of occurrence of the operations whose response times are greater than the threshold is a combination of a burst of operation requests and a conflict over resources to be used for the operations.

10. The non-transitory computer-readable storage medium according to claim 1, wherein the procedure further includes displaying either a first scatter diagram or a second scatter diagram by referring to the storage unit, in response to an input that specifies a display method, the first scatter diagram having a horizontal axis representing a request input time and a vertical axis representing a length of response time, the second scatter diagram having a horizontal axis representing a response output time and a vertical axis representing a length of response time.

11. An analysis method comprising:
- extracting, by a processor, from a storage unit, the storage unit storing a plurality of processing period records each including a request input time when an operation request is input to a device under analysis and a response output time when a response resulting from an operation performed in response to the operation request is output from the device under analysis, one or more of the plurality of processing period records corresponding to operations whose response times from the respective request input times to the respective response output times are greater than a threshold;
- first analyzing, by the processor, on the basis of the request input times included in the extracted processing period records, variations in input frequency of the operation requests corresponding to the operations whose response times are greater than the threshold;
- second analyzing, by the processor, on the basis of the response output times included in the extracted processing period records, variations in output frequency of the responses corresponding to the operations whose response times are greater than the threshold; and
- determining, by the processor, a cause of occurrence of the operations whose response times are greater than the threshold, on the basis of the variations in input frequency of the operation requests and the variations in output frequency of the responses.

12. An information processing apparatus comprising:
- a memory; and a processor coupled to the memory and configured to perform a procedure including:
- extracting from a storage unit, the storage unit storing a plurality of processing period records each including a request input time when an operation request is input to a device under analysis and a response output time when a response resulting from an operation performed in response to the operation request is output from the device under analysis, one or more of the plurality of processing period records corresponding to operations whose response times from the respective request input times to the respective response output times are greater than a threshold,
- first analyzing, on the basis of the request input times included in the extracted processing period records, variations in input frequency of the operation requests corresponding to the operations whose response times are greater than the threshold,
- second analyzing, on the basis of the response output times included in the extracted processing period records, variations in output frequency of the responses corresponding to the operations whose response times are greater than the threshold, and
- determining a cause of occurrence of the operations whose response times are greater than the threshold, on the basis of the variations in input frequency of the operation requests and the variations in output frequency of the responses.

\* \* \* \* \*